US006400718B1

United States Patent
Yamada et al.

(10) Patent No.: US 6,400,718 B1
(45) Date of Patent: Jun. 4, 2002

(54) CELL SWITCHING DEVICE CAPABLE OF EFFECTING HIT-LESS SWITCHING BETWEEN AN ACTIVE SYSTEM AND A STANDBY SYSTEM

(75) Inventors: Susumu Yamada; Kazuho Kawaguchi; Akiyoshi Shimizu, all of Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/311,865

(22) Filed: May 14, 1999

(30) Foreign Application Priority Data

May 15, 1998 (JP) .......................................... 10-133671

(51) Int. Cl.[7] .............................................. H04L 1/22
(52) U.S. Cl. ....................................... 370/395; 370/219
(58) Field of Search ................................ 370/385, 387, 370/388, 395, 398, 399, 412, 413, 415, 417, 428, 219, 220

(56) References Cited

U.S. PATENT DOCUMENTS

| 5,283,782 A | * | 2/1994 | Takase et al. ............... 370/219 |
| 5,398,235 A | * | 3/1995 | Tsuzuki et al. ............. 370/219 |
| 5,719,865 A | * | 2/1998 | Sato ........................... 370/395 |
| 6,252,846 B1 | * | 6/2001 | Fujita ......................... 370/220 |
| 2001/0009552 A1 | * | 7/2001 | Parruck et al. ............. 370/395 |

* cited by examiner

Primary Examiner—Douglas Olms
Assistant Examiner—Ken Vanderpuye
(74) Attorney, Agent, or Firm—Venable; Robert J. Frank; Michael A. Sartori

(57) ABSTRACT

A hit-less cell switching device capable of switching ATM (Asynchronous Transfer Mode) cells between a system ZERO and a system ONE is disclosed. The system ZERO includes a first cell switch, a first input cell gate, a first output cell gate, and a first shaper. Likewise, the system ONE includes a second cell switch, a second input cell gate, a second output cell gate, and a second shaper. First, a controller opens the first and second input cell gates and first output cell gate, closes the second output cell gate, and puts the first and second cell switches and first and second shapers in a fully switched condition, thereby initializing the switching device. Subsequently, the controller closes the second input cell gate, evacuates queue buffers included in the second cell switch and second shaper, and opens the second output gate. After putting the two cell switches and two shapers in an in-switching state, the controller closes the first input cell gate and opens the second input cell gate simultaneously. When the first cell switch and first shaper are evacuated and the arrival of cells ends, the controller causes the second cell switch and second shaper to read cells out of their queue buffers, respectively. On confirming the end of switching of the first cell switch and first shaper, the controller closes the first output cell gate and opens the first input cell gate, thereby completing switching from the system ZERO to the system ONE.

6 Claims, 36 Drawing Sheets

| Fig. 1A | Fig. 1B |

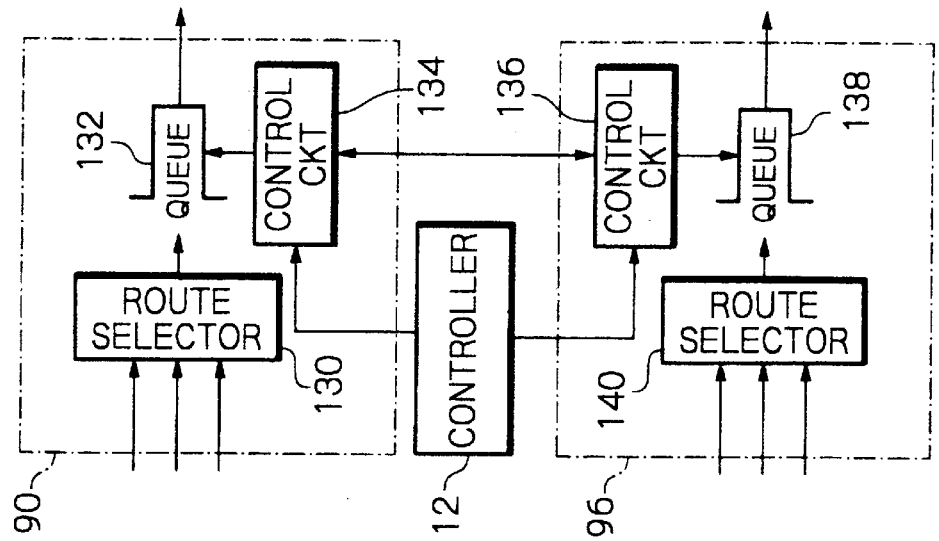
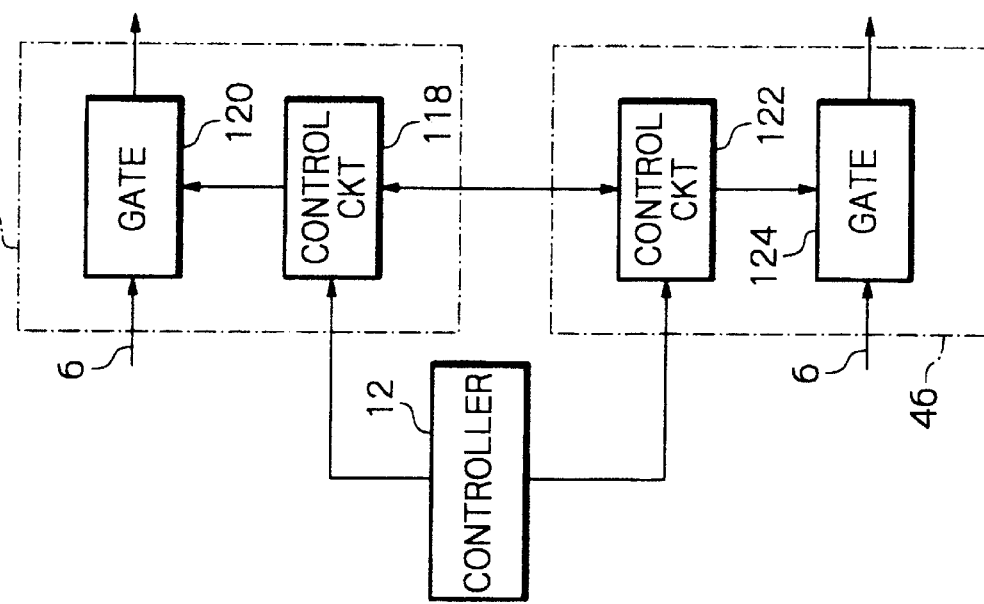

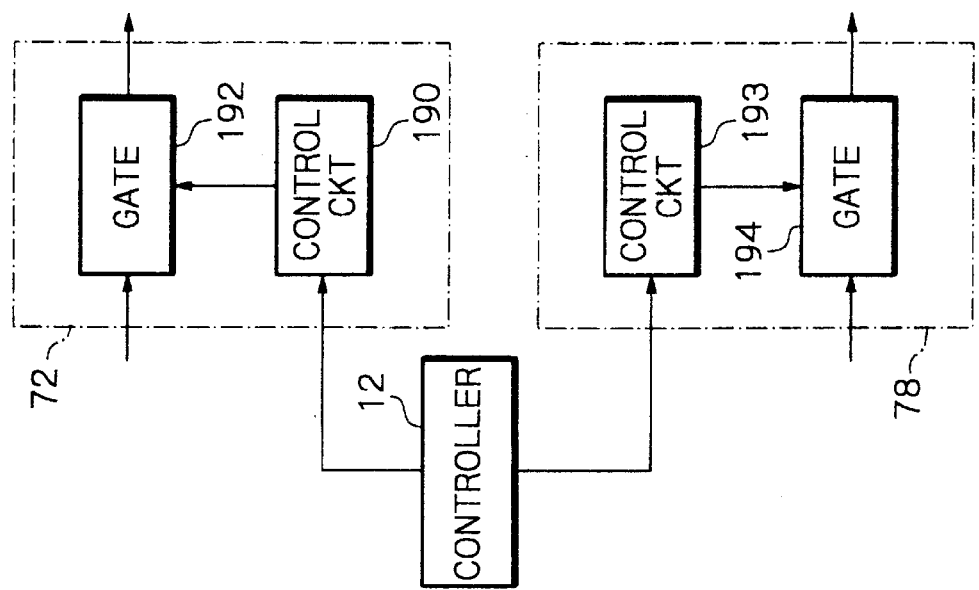
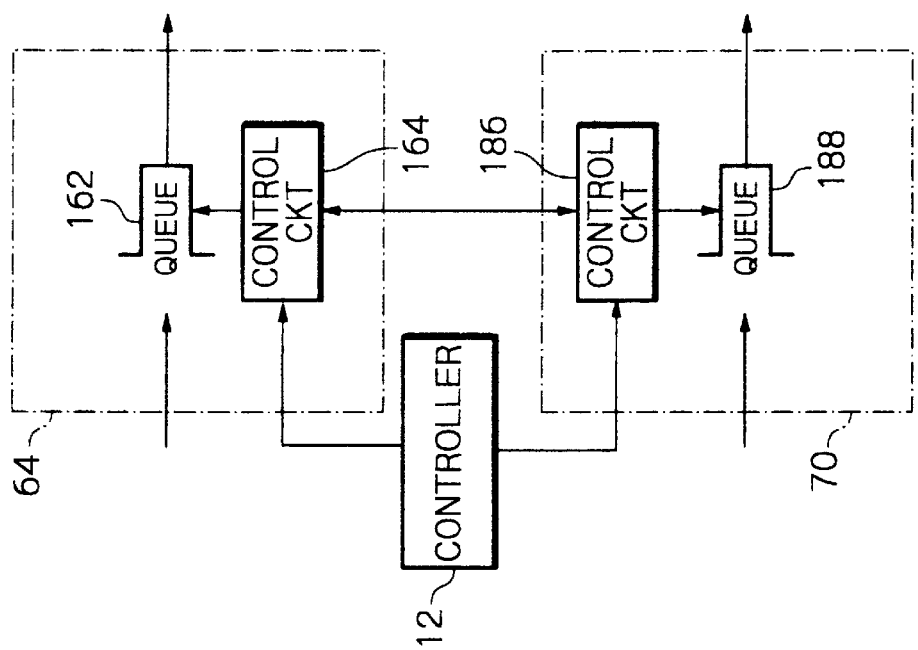

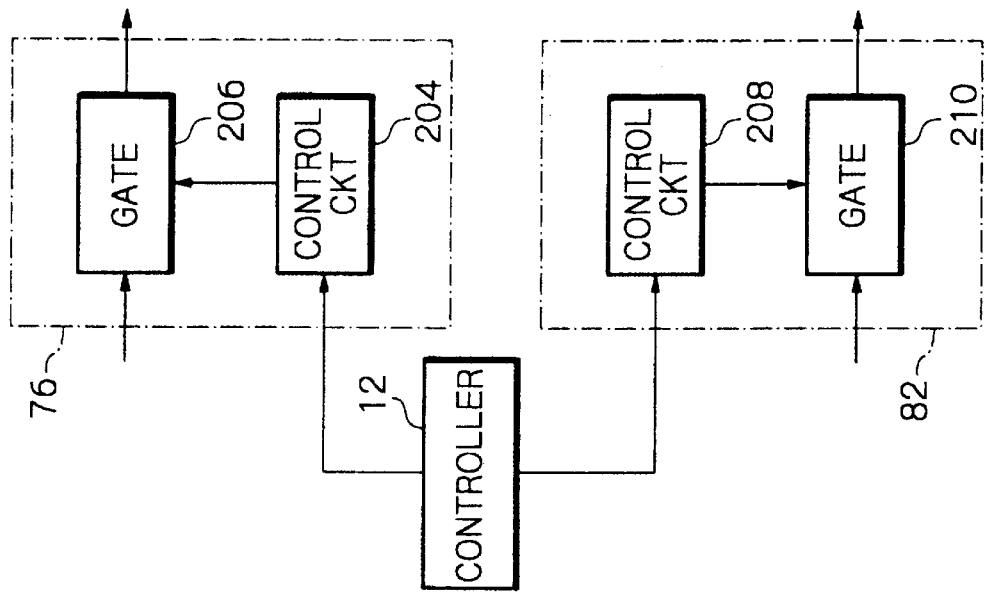
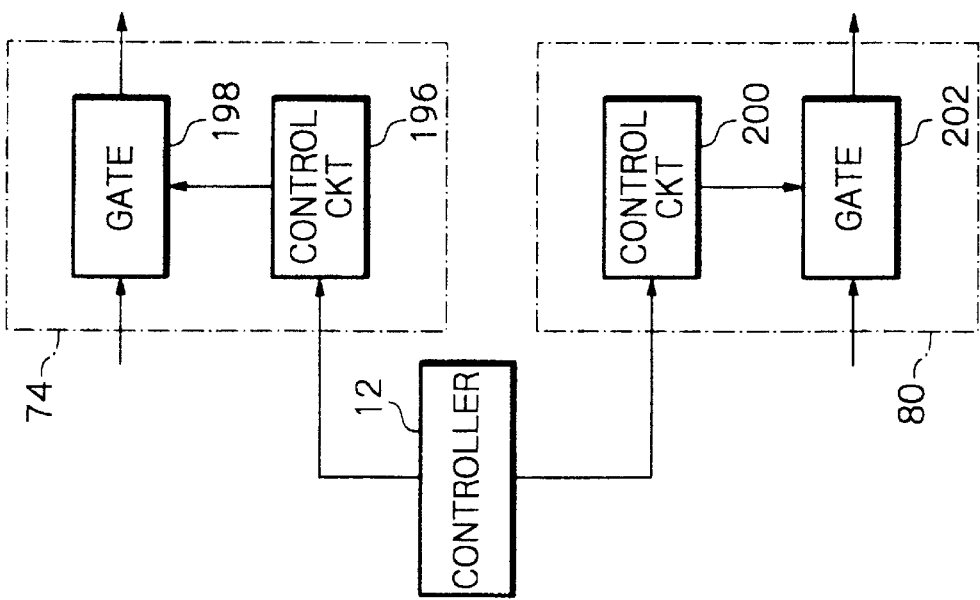

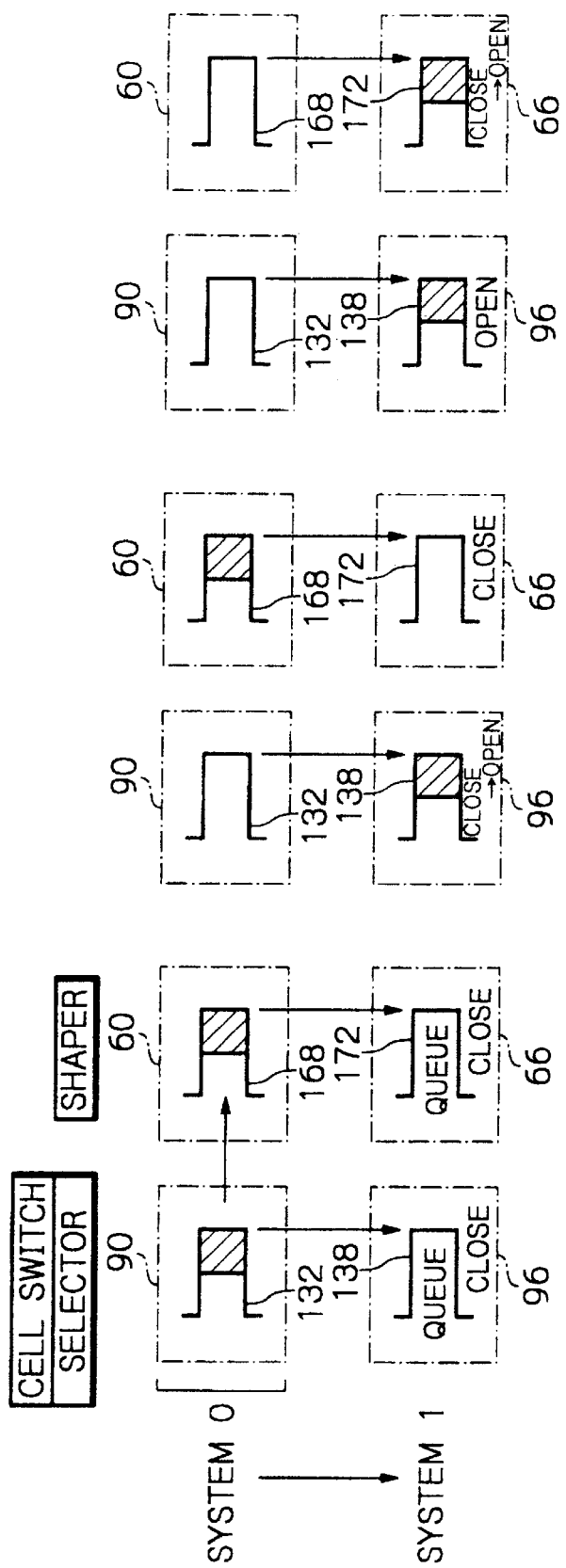

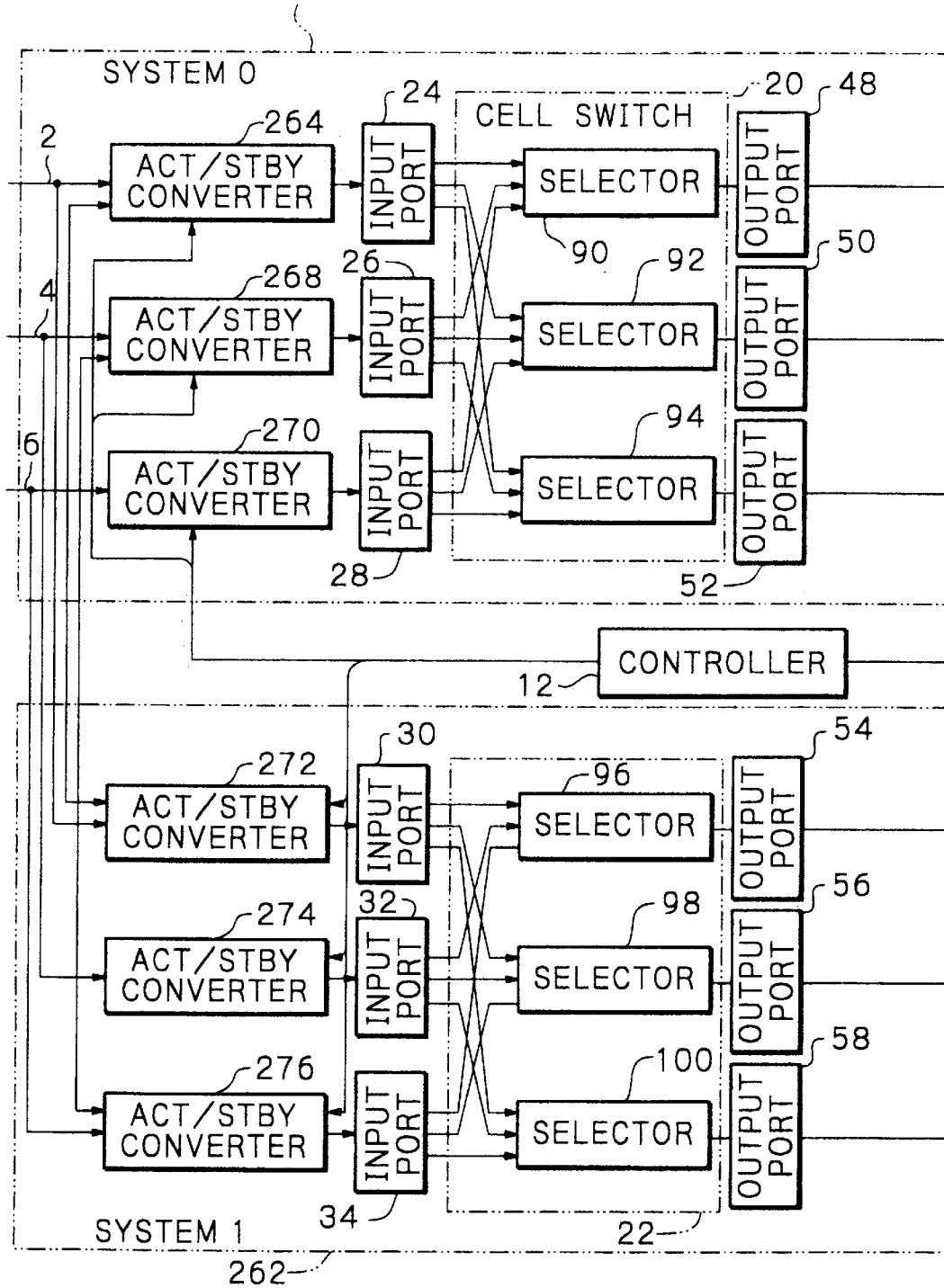

| Fig.22A | Fig.22B |

Fig. 24

| INPUT #1 | INPUT #2 | OUTPUT |
|---|---|---|
| ACT cell | ACT cell | no output or output with queuing |
| ACT cell | STBY cell or null cell | ACT cell |
| STBY cell or null cell | ACT cell | ACT cell |
| STBY cell | null cell | STBY cell |
| null cell | STBY cell | STBY cell |
| null cell | null cell | null cell |

Fig. 28

| FIGS. 1A & 1B (1ST EMBODIMENT) | | FIGS. 22A & 22B (2ND EMBODIMENT) | |
|---|---|---|---|
| CELL GATE | | CELL GATE | ACT CONVERTER |
| 36 | | 36 | |
| 42 | | 42 | |
| 72 | | 344 | 264,348 |
| 78 | | 346 | 272,350 |

| QUEUE BUFFER | |
|---|---|
| SWITCH & SHAPER | SHAPERS 340 & 342 |

| Fig. 31A | Fig. 31B |

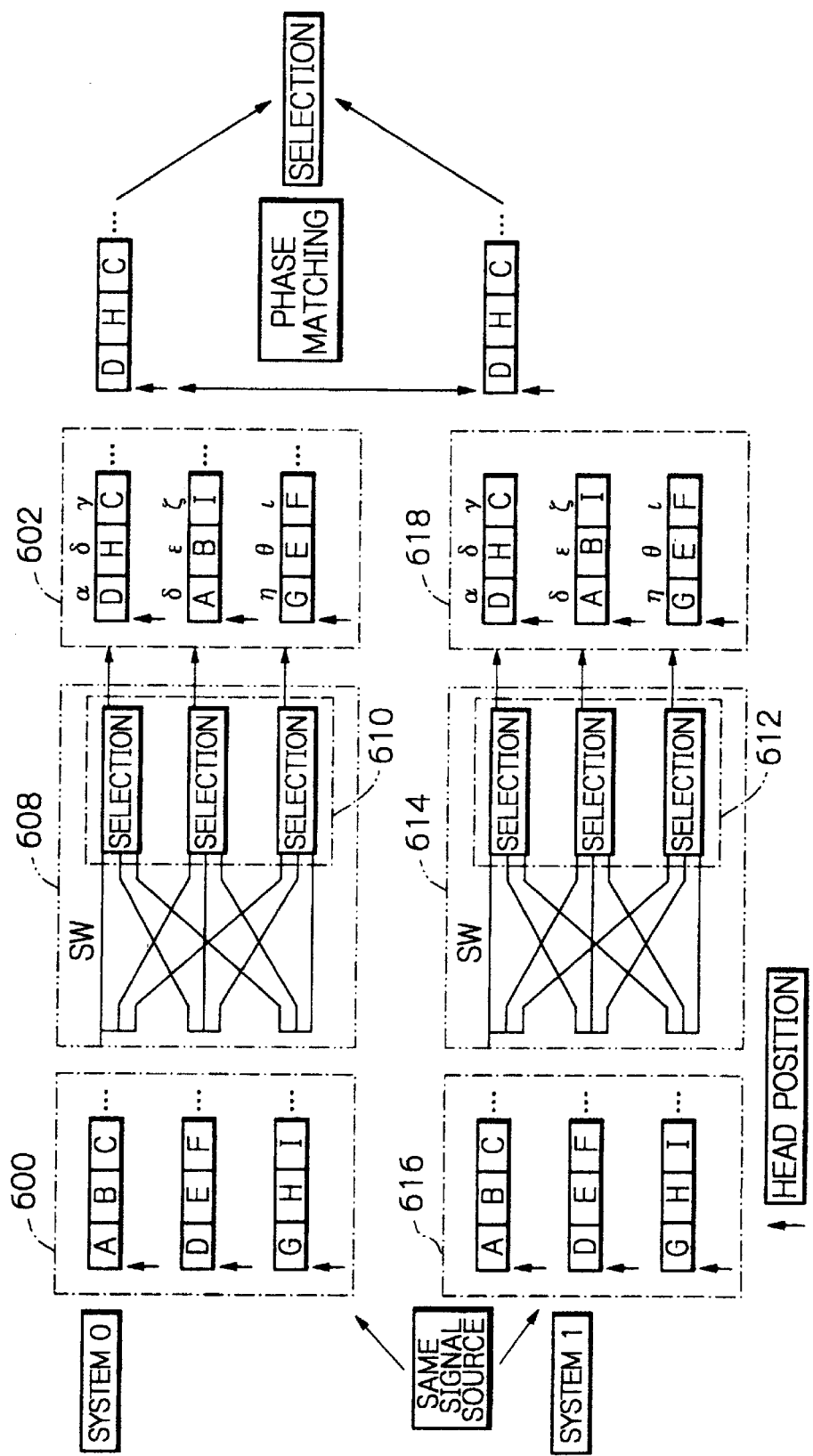

# US 6,400,718 B1

CELL SWITCHING DEVICE CAPABLE OF EFFECTING HIT-LESS SWITCHING BETWEEN AN ACTIVE SYSTEM AND A STANDBY SYSTEM

BACKGROUND OF THE INVENTION

1. Field of the Invention

The present invention relates to a cell switching device and more particularly to a cell switching device capable of effecting hit-less switching between an active system and a standby system, i.e., a cell switching system ZERO and a cell switching system ONE.

2. Description of the Background Art

An exchange, transmission apparatus or similar communication apparatus installed in a telephone central office or similar communication facility handles a great number of subscriber signals at all times. It is a common practice to provide the major part of such a communication apparatus with a duplex circuit configuration for promoting rapid trouble shooting and easy maintenance. Particularly, a switch portion on which all the subscriber information center is, in many cases, arranged to effect hit-less switching with the duplex circuit configuration.

Today, an ATM (Asynchronous Transfer mode) communication system is extensively used as a communication system capable of promoting the effective use of limited channel resources and easy management. In the ATM communication system, data are separated into cells, or short packets, each having a fixed length of fifty-three bytes and are transferred on a cell-by-cell basis. The number of cells to be sent is dependent upon by the amount of information while a particular number is assigned to each cell for an address management purpose. This kind of system is therefore efficient if a number of calls share a single physical transmission path and a single switch.

An STM (Synchronous Transfer Mode) system, which is another conventional communication system, allows a channel once seized to maintain a preselected information transfer capacity. Specifically, in the STM system, a periodic frame having a preselected duration is formatted and divided into equal short time slots. Signals on different channels each is inserted in a particular time slot and transmitted. A receiving station distinguishes the channels on the basis of information representative of the positions (phases) on the channels in the frame. The STM system is feasible for a telephone network or similar fixed network transferring information as substantially even units and allowing a traffic characteristic to be determined.

Hit-less switching has customarily been effected with a switch using, e.g., the STM system, as follows. The switch is a spatial switch. A plurality of pieces of information to be transferred are multiplexed by a TDM (Time Division Multiplex) scheme on each of a plurality of signal lines each having a particular frequency band. At the outside of the switch, a selecting section switches the information occurring in the same time slot and thereby delivers any desired input signal to the output.

FIG. 37 shows a specific conventional hit-less switching system. As shown, the switching system is generally made up of a system ZERO and a system ONE. The system ZERO includes an input port 600. Assume that in the input port 600 pieces of information to be transferred are inserted in time slots respectively assigned to, e.g., customers A–I, as named from the head to the tail of the frame. Also, the system ZERO includes an output port 602 in which a particular time slot is assigned to each of, e.g., customers $\alpha$–$\iota$, as counted from the head to the tail.

In the above condition, a selecting section 610 included in a switch 608 belonging to the system ZERO is controlled to send, e.g., the signal of the customer D to the customer $\alpha$ or the signal of the customer H to the customer $\beta$. The system ONE, which is another redundant system, also includes a switch 614 having a selecting section 612, an input port 616, and an output port 618. The input port 616 and output port 618 are identical in signal assignment with the input port 600 and output port 602, respectively. To effect hit-less switching between the systems ZERO and ONE, it is necessary that the contents of control over the switches 608 and 614 be exactly the same.

The prerequisite with switching between the systems ZERO and ONE is that all the factors, including the phases of output signals, be exactly the same. In the specific configuration shown in FIG. 37, a phase difference, for example, apt to occur for production reasons may be successfully absorbed if the output signal is temporarily stored in, e.g., a bit buffer.

However, the circuitry shown in FIG. 37 has the following problems as to hit-less switching when applied to the ATM system. To begin with, an ATM cell is provided with numbers designating a source and a destination. A selecting section determines whether or not to take in the ATM cell by identifying the numbers attached to the cell, instead of executing control based on a time slot. Moreover, ATM cells so taken in as a sequence are not always arranged at preselected intervals. The cells therefore must be temporarily stored in a queue circuit in order to uniform the intervals, as needed. Generally, with a queue circuit, it is necessary to uniform the cell intervals by sophisticated control.

Particularly, shapers for uniforming the cell intervals for each of a great number of customers need sophisticated control in many cases. It is likely that only one of the two systems ZERO and ONE is initialized due to a momentary error ascribable to maintenance work or noise. This would prevent the two systems from operating in unison thereafter and would cause the influence of such a condition to remain for a certain period time.

On the other hand, data for control are sometimes calculated in order to meet various traffic control demands. For example, an ABR (Available Bit Rate) which is a dynamically variable bit rate is controlled in order to control a cell rate. For ABR control, a transfer bit rate is dynamically varied in accordance with the operating condition of a network. In this case, the momentary inconformity between the cell sequences of the systems ZERO and ONE affects the result of calculation of the data for ABR control. As a result, the result of calculation differs from the system ZERO to the system ONE, obstructing accurate and adequate ABR control.

SUMMARY OF THE INVENTION

It is therefore an object of the present invention to provide a hit-less cell switching device capable of switching ATM cells between two systems ZERO and ONE with a simple construction, and executing accurate ABR control despite hit-less switching.

In accordance with the present invention, a cell switching device includes first cell switching circuitry including a first input port for receiving cells for ATM communication, and a first cell switch including a queue circuit for temporarily storing the cells. The first cell switch outputs the cells from said queue circuit to a first output port matching with a transfer route. Second cell switching circuitry includes a second input port for receiving cells for ATM communication, and a second cell switch including a queue circuit for temporarily storing the cells. The second cell switch outputs the cells from the queue circuit to a second output port matching with a transfer route. The first cell switching circuitry further includes a first cell gate for selectively passing the cells received to the first input port or blocking the cells, a first shaper including a queue circuit for temporarily storing the cells output from the first output port to thereby adjust intervals between the cells to be transferred, and a second cell gate for selectively passing the cells output from the first shaper or blocking the cells. The second cell switching circuitry further includes a third cell gate for selectively passing the cells received to the second input port or blocking the cells, a second shaper including a queue circuit for temporarily storing the cells output from the second output port to thereby adjust intervals between the cells to be transferred, and a fourth cell gate for selectively passing the cells output from the second shaper or blocking the cells. The first cell gate and the third cell gate have a common input connected to receive cells. When either one of the first and second cell switching circuitry is held in an active state, the other of the first and second cell switching circuitry is held in a standby state. A cell outputting circuit selects and outputs the cells output from either one of the second and fourth cell gates held in an active state. A controller controls the passage of the cells through the first to fourth cell gates and controls the first and second cell switches and the first and second shapers to thereby effect hit-less switching from the one cell switching circuitry held in the active state to the other cell switching circuitry held in the standby state.

BRIEF DESCRIPTION OF THE DRAWINGS

The objects and features of the present invention will become more apparent from the consideration of the following detailed description taken in conjunction with the accompanying drawings in which:

FIGS. 1A and 1B are block diagrams schematically showing a first embodiment of the cell switching device in accordance with the present invention;

FIGS. 2–4 are schematic block diagrams each showing specific configurations of particular input cell gates included in the first embodiment;

FIGS. 5, 6 and 7 are schematic block diagrams each showing specific configurations of particular selectors also included in the first embodiment;

FIGS. 8–10 are schematic block diagrams each showing specific configurations of particular shapers further included in the first embodiment;

FIGS. 11–13 are schematic block diagrams each showing specific configurations of particular output cell gates additionally included in the first embodiment;

FIGS. 16A–16C show how cell switches and shapers included in the first embodiment are interlocked to each other;

FIG. 17 shows how FIGS. 17A and 17B are combined;

FIGS. 17A and 17B are block diagrams schematically showing a second embodiment of the cell switching device in accordance with the present invention;

FIGS. 22A and 22B are block diagrams schematically showing a third embodiment of the cell switching device in accordance with the present invention;

FIG. 24 is a table representative of the function of an active filter also included in the third embodiment;

FIG. 28 is a table listing a relation between the structural elements of the first embodiment and those of the third embodiment;

FIGS. 31A and 31B are block diagrams schematically showing a fourth embodiment of the cell switching device in accordance with the present invention;

FIG. 37 is a schematic block diagram showing a specific conventional hit-less switching system for an STM communication system.

DESCRIPTION OF THE PREFERRED EMBODIMENTS

Preferred embodiments of the cell switching device in accordance with the present invention will be described hereinafter. The embodiments to be described are applied to an output buffer type ATM communication system by way of example.

First Embodiment

Figure 1A:
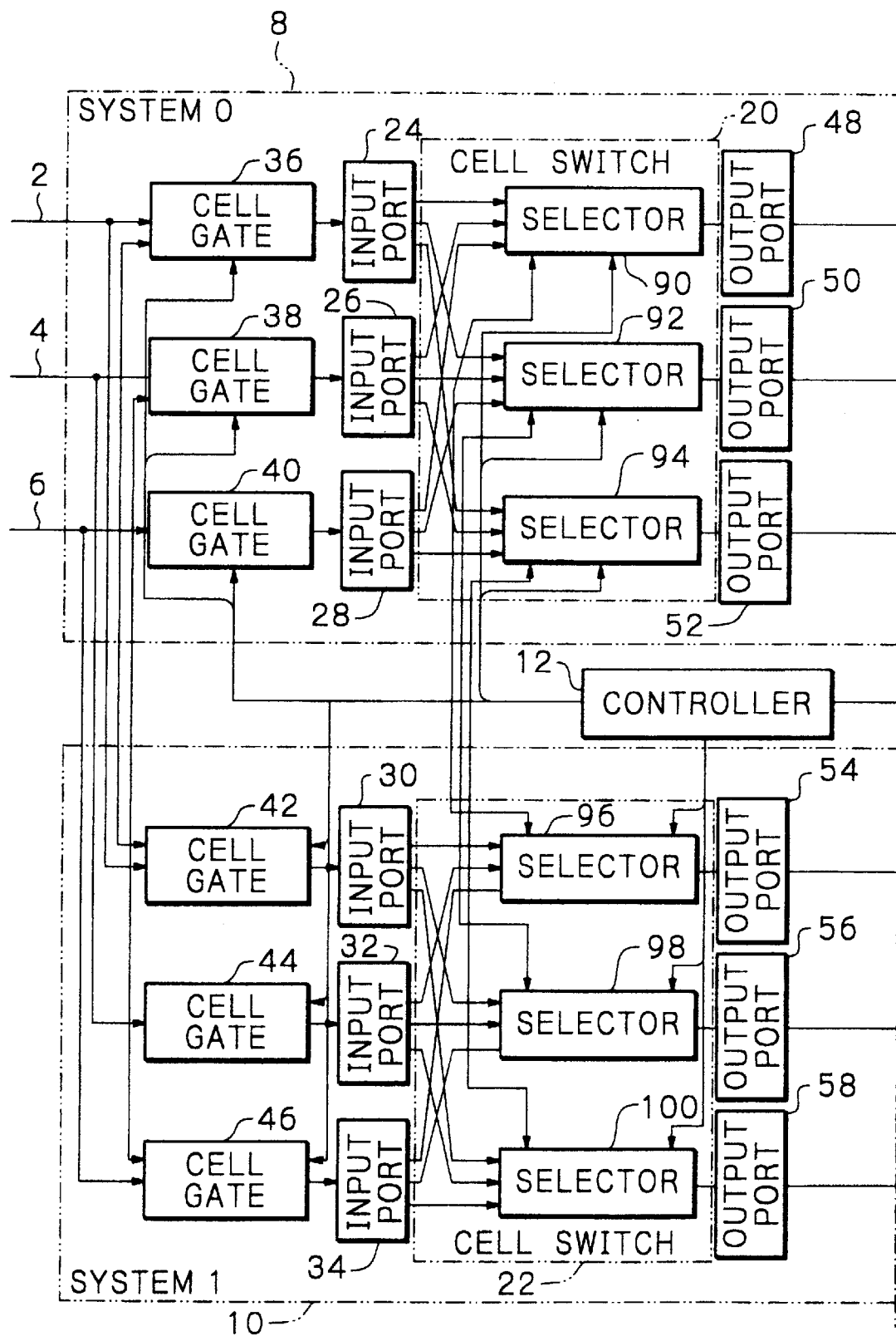
FIGS. 1A and 1B are combined.
Figures 1, 1B:
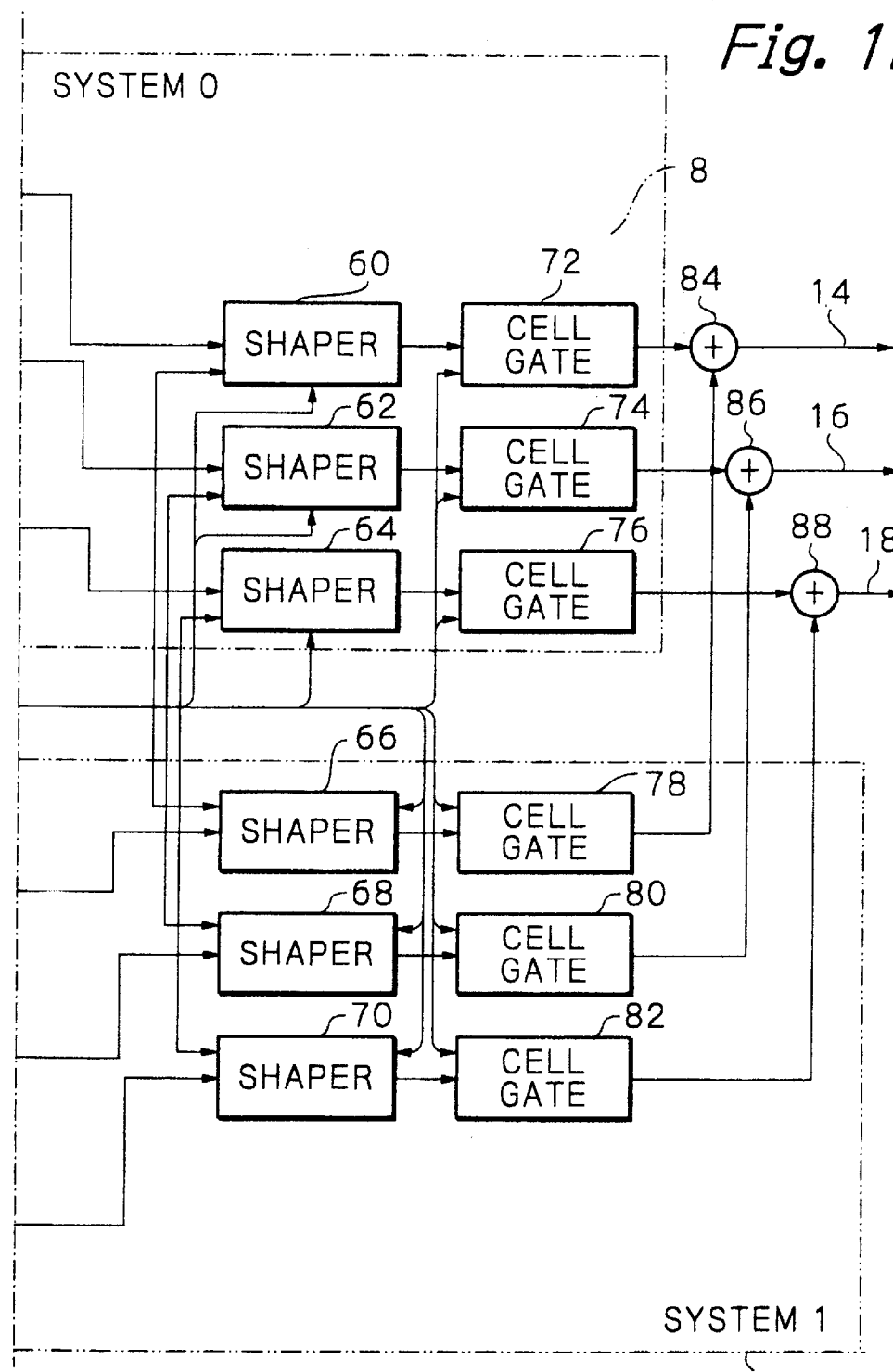
FIG. 1 shows how

Referring to FIGS. 1A and 1B, a cell switching device embodying the present invention is shown and includes switching circuitry 8 and 10 assigned to a system ZERO and a system ONE, respectively. Cells coming in through input lines 2, 4 and 6 are input to both of the switching circuitry 8 and 10. Assume that a controller 12 controlling the entire cell switching device designates the switching circuitry 8 and 10 as active circuitry and standby circuitry, respectively, by way of example. Then, significant or usual cells propagated through the active circuitry 8 are applied to output lines 14, 16 and 18 while null cells or insignificant cells are output from the standby circuitry 10. The null cells may be cells whose data are all ZEROs. When the controller 12 replaces the active circuitry 8 and standby circuitry 10 by hit-less switching, significant cells output from the circuitry 10, which is now active, are applied to the output lines 14, 16 and 18; null cells are output from the circuitry 8 which is now standby.

The switching circuitry 8 and 10 respectively include cell switches 20 and 22 respectively having input ports 24, 26 and 28 and input ports 30, 32 and 34. In the illustrative embodiment, cell gates 36, 38 and 40 and cell gates 42, 44 and 46 are respectively connected to the input ports 24, 26 and 28 and input ports 30, 32 and 34 for controlling the passage of input cells. In this sense, the cell gates 36–46 will be referred as to input cell gates 36–46 hereinafter. Further, the cell switch 20 and 22 have output ports 48, 50 and 52 and output ports 54, 56 and 58, respectively. Shapers 60, 62 and 64 and shapers 66, 68 and 70 are respectively connected to the output ports 48, 50 and 52 and output ports 54, 56 and 58 for controlling the transfer rate of cells. Cell gates 72, 74 and 76 and cell gates 78, 80 and 82 are respectively connected to the shapers 60, 62 and 64 and shapers 66, 68 and 70 in order to control the passage of cells output from the shapers 60–70. In this sense, the cell gates 72–82 will be referred to as output cell gates 72–82 hereinafter. The controller 12 controls the passage and read-out of cells at the input cell gates 36–46, cell switches 20 and 22, shapers 60–70 and output cell gates 72–82 in order to implement hit-less switching from the circuitry 8 to the circuitry 10, or vice versa.

An OR gate 84 produces an OR of cells output from the switching circuitry 8 and 10 belonging to the systems ZERO and ONE, respectively, and delivers the OR to the output line 14. For example, when the output cell gates 72 and 78 respectively output a significant cell and a null cell, the significant cell is applied from the OR gate 84 to the output line 14. If the cells applied to the OR gate 84 both are null, then the null cell is applied from the OR gate 84 to the output line 14.

In the case where a null cell defines particular data, there may be used a circuit which does not OR cells, but simply discards the null cell, and selects a significant cell output from the active circuitry. OR gates 86 and 88 function in exactly the same manner as the OR gate 84 and apply significant cells to the output lines 16 and 18, respectively.

A control section is included in each of the input cell gates 36 and 42 preceding the cell switches 20 and 22, respectively, and causes the associated cell gate 36 or 42 to operate contrarily to the other cell gate alternately every cell cycle. All the input cell gates 36–40 and 42–46 are switched in synchronism with each other from the same cell cycle with respect to all the input ports 24–28 and 30–34 to the cell switches 20 and 22. Contrary operations occurring alternately refer to the fact that in a given ell cycle n the cell switching circuitry 8 and 10 respectively output significant cells and null cells, but in the next cycle n+1 the circuitry 8 and 10 respectively output null cells and significant cells.

Figure 2:
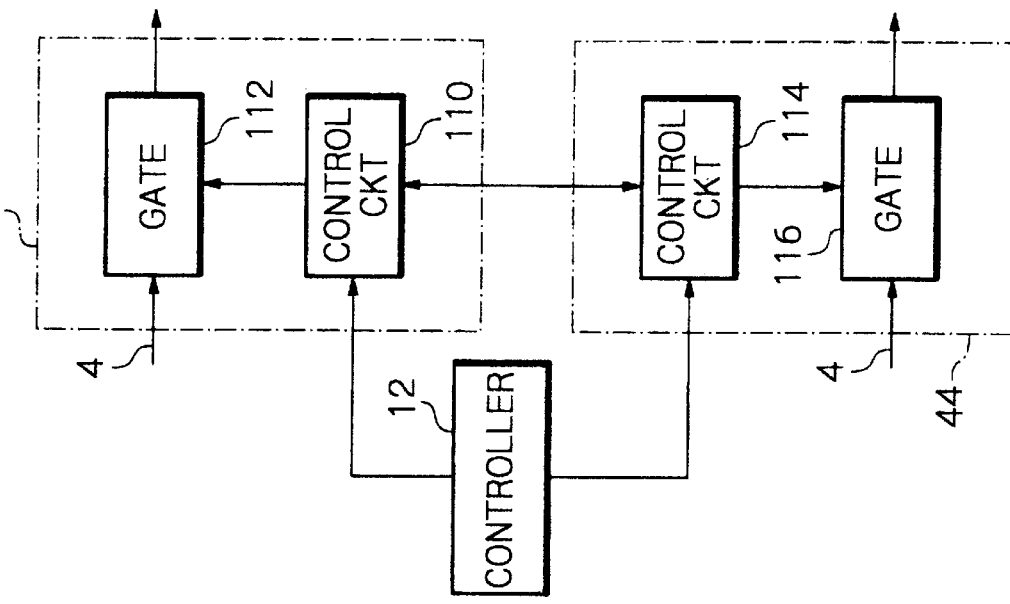
Figure 3:
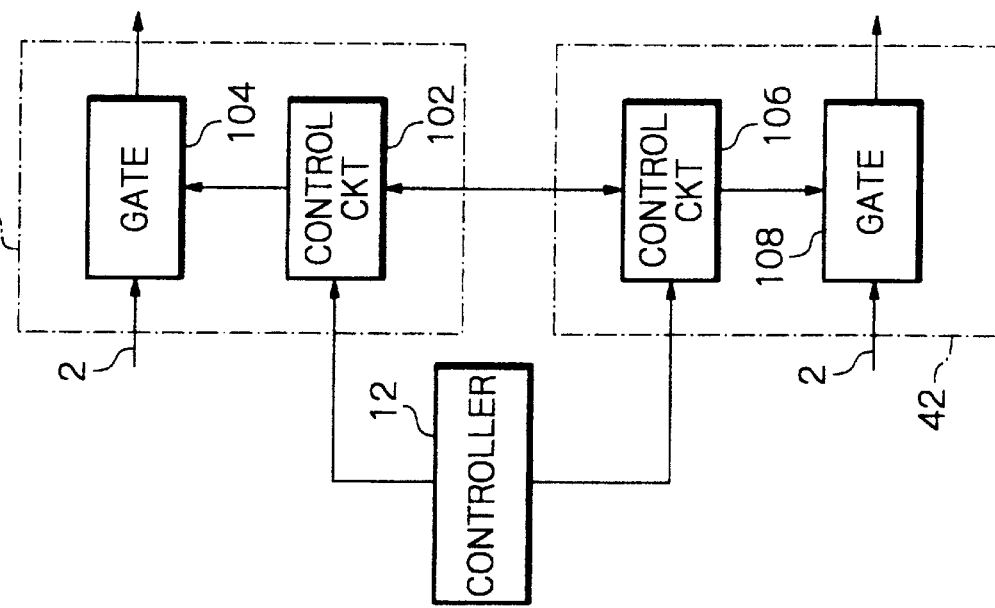

FIGS. 2, 3 and 4 respectively show specific configurations of the input cell gates 36 and 42, 38 and 44, and 40 and 46. Specifically, FIG. 2 shows specific configurations of the cell gates 36 and 42 expected to operate contrarily to each other, a relation between the cell gates 36 and 42, and a relation between the cell gates 36 and 42 and the controller 12. As shown, the cell gate 36 is made up of a control circuit 102 and a gate circuit 104. When the control circuit 102 receives an "active" command or a "standby" command from the controller 12, it feeds an "open" command or a "close" command, respectively, to the gate circuit 104. In response to the "open" command, the gate circuit 104 opens the cell gate 36 and outputs an input cell (significant cell) received via the input line 2. In response to the "close" command, the gate circuit 104 closes the cell gate 36 and outputs a null cell. The cell output from the gate circuit 104 is fed to the input port 24 to the cell switch 20.

Further, the control circuit 102 cooperates with a control circuit 106 included in the input cell gate 42 such that the cell gates 36 and 42 operate contrarily to each other every cell cycle. The construction and operation of the input cell gate 42, i.e., the control circuit 106 and a gate circuit 108 are identical with the construction and operation of the cell gate 36 and will not be described specifically in order to avoid redundancy. A cell output from the gate circuit 108 is applied to the input port 30 to the cell switch 22.

FIG. 3 shows specific configurations of the input cell gates 38 and 44 expected to operate contrarily to each other, a relation between the cell gates 38 and 44, and a relation between the cell gates 38 and 44 and the controller 12. As shown, the cell gate 38 has a control circuit 110 and a gate circuit 112 while the cell gate 44 has a control circuit 114 and a gate circuit 116. FIG. 4 shows specific configurations of the input cell gates 40 and 46 expected to operate contrarily to each other, a relation between the cell gates 40 and 46, and a relation between the cell gates and the controller 12. As shown, the cell gate 40 has a control circuit 118 and a gate circuit 120 while the cell gate 46 has a control circuit 122 and a gate circuit 124. The cell gates 38, 44, 40 and 46 are identical in construction and operation with the cell gates 36 and 42 and will not be described specifically in order to avoid redundancy.

Referring again to FIGS. 1A and 1B, the cell switch 20 belonging to the system ZERO includes selectors 90, 92 and 94. Cells input via the input ports 24–28 each is applied to all of the three selectors 90–94. Likewise, the cell switch 22 belonging to the system ONE includes selectors 96, 98 and 100. Cells input via the input ports 30–34 each is distributed to all of the three selectors 96–100.

The cell switches 20 and 22 each determines, on an output port basis, whether or not cells received via the respective input ports 24–28 or 30–34 are meant therefor, and takes in all of the cells meant therefor. The cells taken in are temporarily written to queue buffers which are respectively included in the selectors 90–94 or 96–100, as will be described specifically later. Even if cells which will center on a single output port are applied to a plurality of input ports at the same time, they can be output to the output port so long as they are confined in a range determined by the queue buffer. Should the storage of cells in the queue buffers continue over an extremely long period of time, a part of the stored cells would be discarded. The illustrative embodiment is so constructed as to cause such an occurrence to be extremely rarely brought about.

FIG. 5 shows a specific configuration of the selector 90 included in the cell switch 20 and that of the selector 96 included in the cell switch 22, a relation between the selectors 90 and 96, and a relation between the selectors 90 and 96 and the controller 12. As shown, the selector 90 is made up of a route selection circuit 130, a queue buffer 132, and a control circuit 134. Likewise, the selector 96 is made up of a route selection circuit 140, a control circuit 136, and a queue buffer 138. The route selection circuit 130 selects, based on route information included in cells input via the input ports 24–28, a cell whose route is identical with the route assigned to the route selection circuit 130, and feeds the cell to the queue buffer 132. The queue buffer 132 temporarily stores the input cell under the control of the control circuit 134 while sequentially delivering such cells to the output port 48, FIG. 1, also under the control of the control circuit 134. The controller 12 delivers an "active" command or a "standby" command to the control circuit 134 of the selector 90. In response, the control circuit 134 interchanges signals with the control circuit 136 of the selector 96 in order to perform a hit-less switching operation. The controller 12 is capable of controlling the interruption of cell read-out queue buffer by queue buffer. For example, assume that the queue buffers 132 and 138 of the selectors 90 and 96 are active and standby, respectively. Then, the controller 12 monitors the queue buffer 132 as to vacancy and monitors the queue buffer 138 as to the arrival of a cell and cancels, on confirming the end of cell output from the queue buffer 132, the interruption of cell read-out from the queue buffer 138.

As for control between the control circuits 134 and 136, the controller 12 is capable of setting up an in-switching condition, i.e., a condition wherein the switching operation is under way. Specifically, in the in-switching condition, the controller 12 interrupts the read-out of cells from all of the queue buffers of the substitute system to become active and executes hardware control until the read-out from such queue buffers begins. The controller 12 maintains the in-switching condition until an end-of-switching report appears after all of the above queue buffers have been switched.

The control circuit 136 of the selector 96 is rendered active or standby by the controller 12 and executes the above switching control by interchanging signals with the control circuit 134 of the selector 90. In addition, the control circuit 136 writes cells selected by the route selection circuit 140 in the queue buffer 138 and reads them out of the same.

Figure 7:
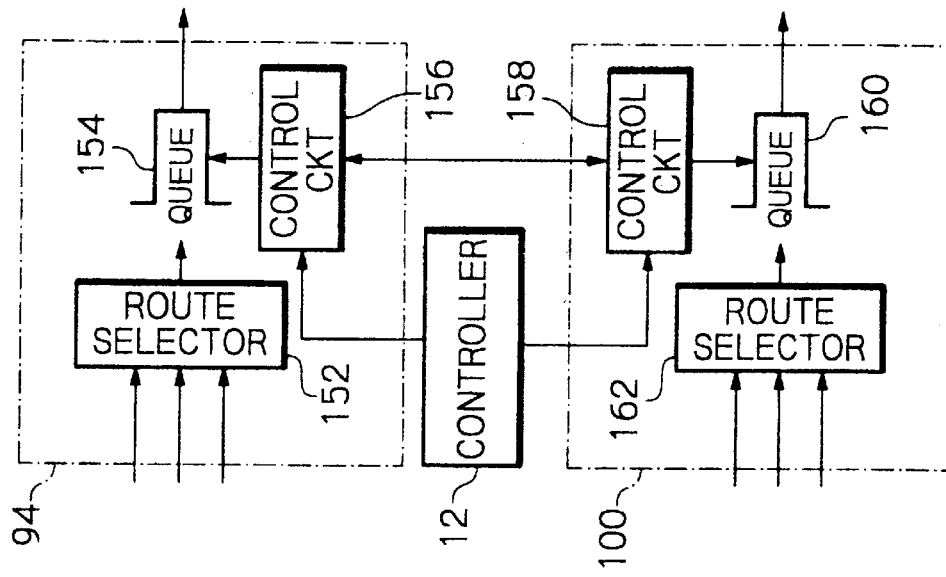
Figure 6:
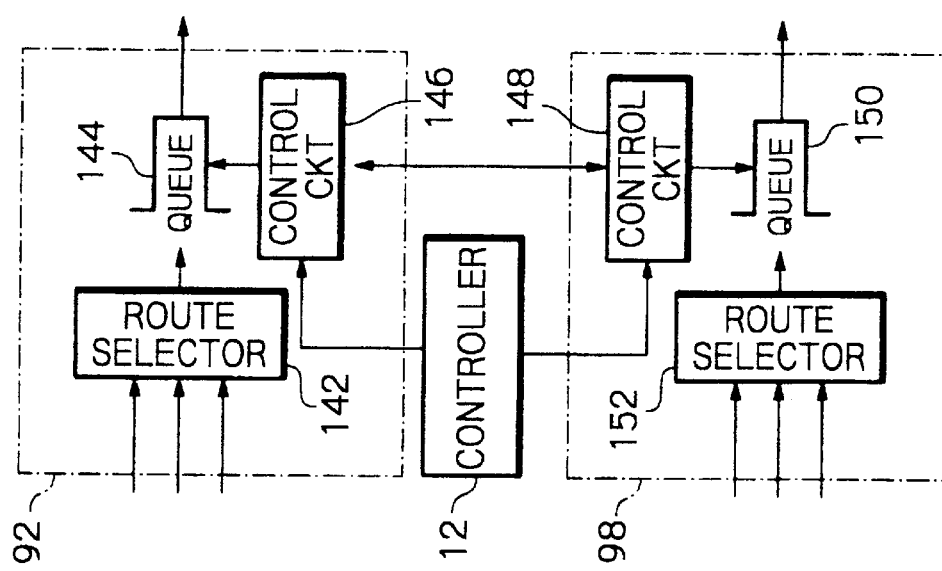

FIG. 6 shows a specific configuration of the selector 92 of the cell switch 20 and that of the selector 98 of the cell switch 22 interlocked to the selector 92, a relation between the selectors 92 and 98, and a relation between the selectors 92 and 98 and the controller 12. As shown, the selector 92 is made up of a route selection circuit 142, a queue buffer 144, and a control circuit 146. Likewise, the selector 98 is made up of a control circuit 148, a queue buffer 150, and a route selection circuit 152. FIG. 7 shows a specific configuration of the selector 94 of the cell switch 20 and that of the selector 100 of the cell switch 22 interlocked to the selector 94, a relation between the selectors 94 and 100, and a relation between the selectors 94 and 100 and the controller 12. As shown, the selector 94 is made up of a route selection circuit 152, a queue buffer 154, and a control circuit 156. Likewise, the selector 100 is made up of a control circuit 158, a queue buffer 160, and a route selection circuit 162. The construction and operation of the selectors 92, 98, 94 and 100 are identical with the construction and operation of the selectors 90 and 96, FIG. 5, and will not be described specifically in order to avoid redundancy.

Referring again to FIGS. 1A and 1B, the shapers 60, 62 and 64 and shapers 66, 68 and 70 belonging to the systems ZERO and ONE, respectively, each has a respective queue buffer which will be described in detail later. In the illustrative embodiments, the shapers 60–70 each has a plurality of queue buffers respectively allocated to preselected subscribers or preselected groups or units. Preferably, cells output from a plurality of queue buffers should be applied to the same signal line, and the output timing should be adjustable between the queue buffers.

Figure 8:
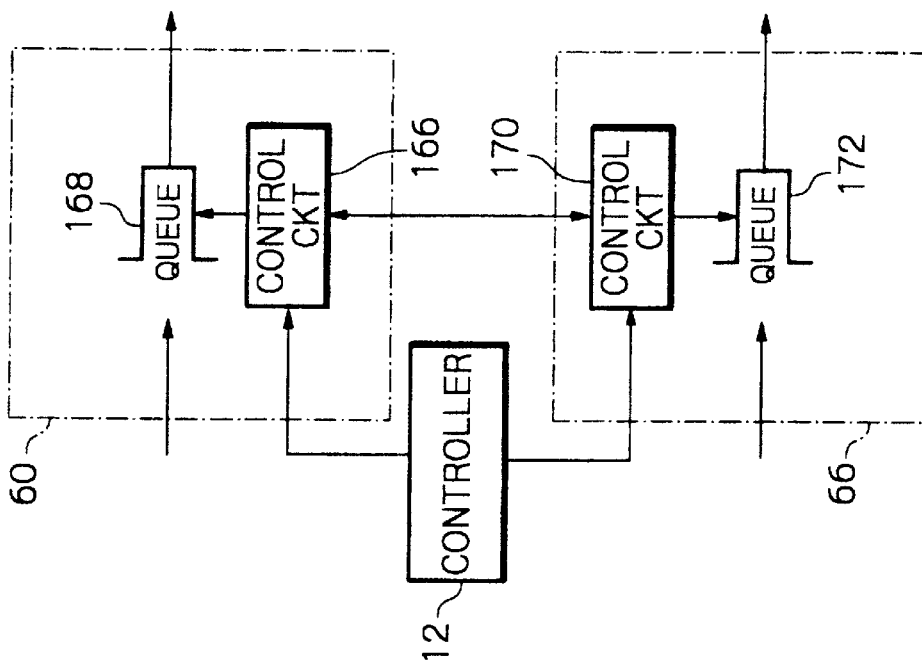

FIG. 8 shows a specific configuration of the above shaper 60 and that of the shaper 66 interlocked to the shaper 60, a relation between the shapers 60 and 66, and a relation between the shapers 60 and 66 and the controller 12. As shown, the shaper 60 is made up of a control circuit 166 and a queue buffer 168 while the shaper 66 is made up of a control circuit 170 and a queue buffer 172. The controller 12 renders the control circuit 166 of the shaper 60 active or standby. The control circuit 166 writes cells input from the output port 48, FIG. 1, in the queue buffer 168 or reads them out of the same. On receiving an "active" command or a "standby" command from the controller 12, the control circuit 166 interchanges signals with the control circuit 170 of the shaper 66 in order to perform a hit-less switching operation.

The controller 12 is capable of controlling the interruption of cell read-out queue buffer by queue buffer. For example, assume that the queue buffers 168 and 172 are active and standby, respectively. Then, the controller 12 monitors the queue buffer 168 as to vacancy and monitors the queue buffer 172 as to the arrival of a cell and cancels, on confirming the end of cell output from the queue buffer 168, the interruption of cell read-out from the queue buffer 172.

Again, as for control between the control circuits 166 and 170, the controller 12 is capable of setting up an in-switching condition. Specifically, in the in-switching condition, the controller 12 interrupts the read-out of cells from all of the queue buffers in the substitute system to become active and executes hardware control until the read-out from such queue buffers begins. The controller 12 maintains the in-switching condition until an end-of-switching report appears after all of the above queue buffers have been switched.

The control circuit 170 of the shaper 66 is rendered active or standby by the controller 12 and executes the above switching control by interchanging signals with the control circuit 166 of the shaper 60. In addition, the control circuit 170 writes cells input form the output port 54, FIG. 1, in the queue buffer 172 and reads them out of the same.

Figure 9:
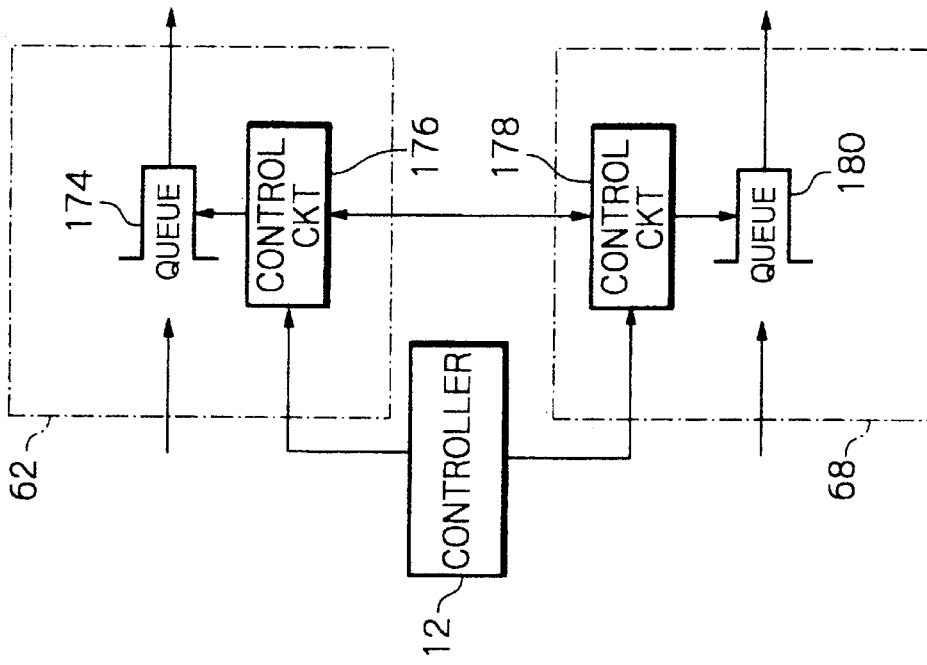

FIG. 9 shows a specific configuration of the shaper 62 and that of the shaper 68 interlocked to the shaper 62, a relation between the shapers 62 and 68, and a relation between the shapers 62 and 68 and the controller 12. As shown, the shaper 62 is made up of a queue buffer 174 and a control circuit 176 while the shaper 68 is made up of a control circuit 178 and a queue buffer 180. FIG. 10 shows a specific configuration of the shaper 64 and that of the shaper 70 interlocked to the shaper 64, a relation between the shapers 64 and 70, and a relation between the shapers 64 and 70 and the controller 12. As shown, the shaper 64 is made up of a queue buffer 162 and a control circuit 164 while the shaper 70 is made up of a control circuit 186 and a queue buffer 188. The construction and operation of the shapers 62, 68, 64 and 70 are identical with the construction and operation of the shapers 60 and 66, FIG. 8, and will not be described specifically in order to avoid redundancy.

FIG. 11 shows a specific configuration of the output cell gate 72, FIG. 1, assigned to the system ZERO and that of the output cell gate 78, FIG. 1, assigned to the system ONE and associated with the cell gate 72, together with a relation between the cell gates 72 and 78 and the controller 12. As shown, the cell gate 72 has a control circuit 190 and a gate circuit 192 while the cell gate 78 has a control circuit 193 and a gate circuit 194. The controller 12 delivers a control signal to the control circuit 190 of the cell gate 72 for causing it to open or close the gate circuit 192. In response, the control circuit 190 opens the gate circuit 192 for passing input cells or closes it for outputting null cells. Likewise, in response to a control signal received from the controller 12, the control circuit 193 of the cell gate 78 opens the gate circuit 194 for passing input cells or closes it for outputting null cells.

FIG. 12 shows a specific configuration of the output cell gate 74 assigned to the system ZERO and that of the output cell gate 80 assigned to the system ONE and associated with the cell gate 74, together with a relation between the cell gates 74 and 80 and the controller 12. As shown, the cell gate 74 has a control circuit 196 and a gate circuit 198 while the cell gate 80 has a control circuit 200 and a gate circuit 202. FIG. 13 shows a specific configuration of the output cell gate 76 assigned to the system ZERO and that of the output cell gate 82 assigned to the system ONE and associated with the cell gate 76, together with a relation between the cell gates 76 and 82 and the controller 12. As shown, the cell gate 76 has a control circuit 204 and a gate circuit 206 while the cell gate 82 has a control circuit 208 and a gate circuit 210. The construction and operation of the cell gates 74, 80, 76 and 82 are identical with the construction and operation of the cell gates 72 and 78, FIG. 11, and will not be described specifically in order to avoid redundancy.

Figure 14:
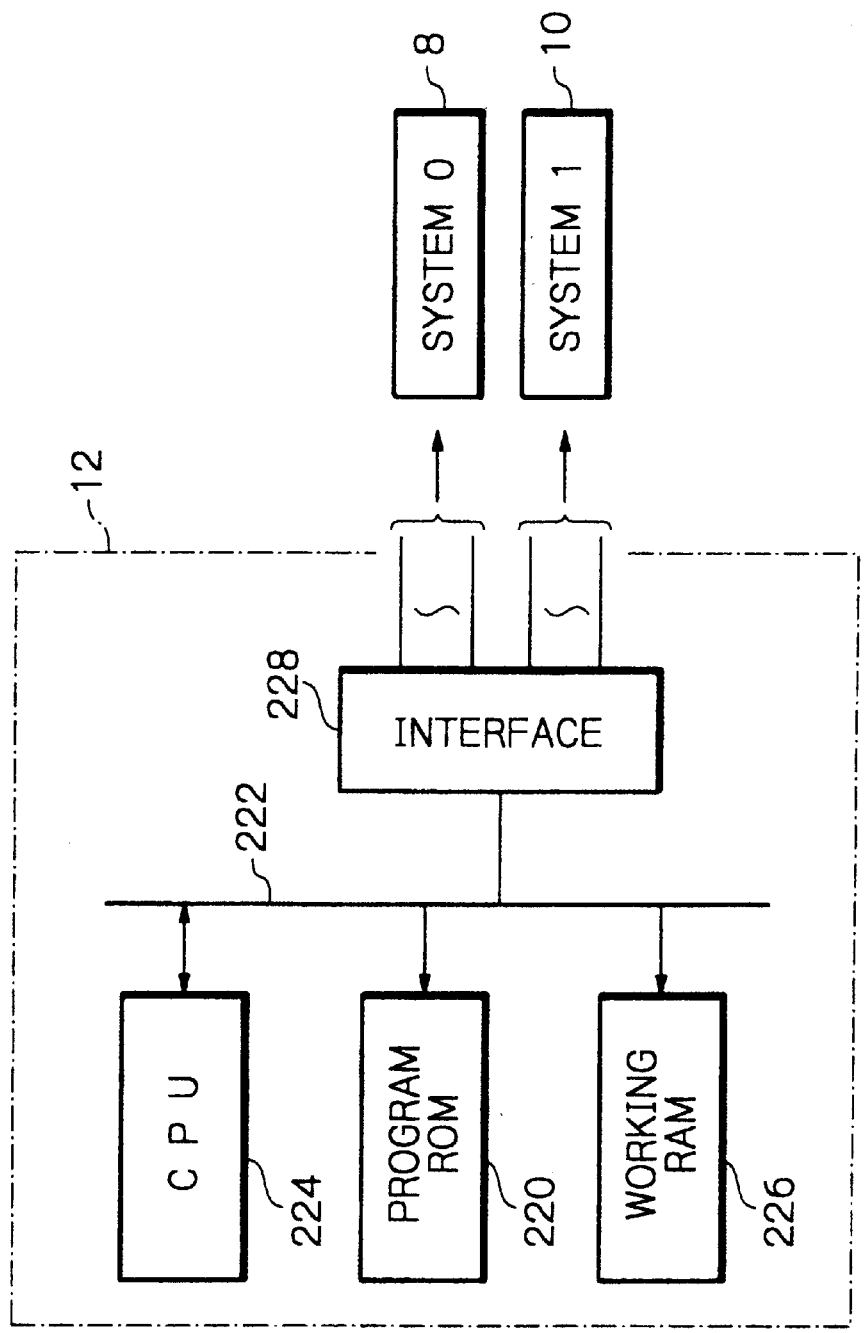
FIG. 14 is a block diagram schematically showing a specific configuration of a controller for controlling the various sections of the first embodiment.

A specific configuration of the controller 12 is shown in FIG. 14. As shown, the controller 12 is made up of a program ROM (Read Only Memory) 220, a CPU (Central Processing Unit) 224, a working RAM (Random Access Memory) 226 and an interface 228 connected together by a bus line 222. The program ROM 220 stores a program for allowing the CPU 224 to selectively open or close the input cell gates 36–40 and output cell gates 72–76 assigned to the system ZERO, to control the read-out of cells out of the queue buffers of the cell switch 20 and shapers 60–64 assigned to the system ZERO, to selectively open or close the input cell gates 42–46 assigned to the system ONE, and to control the read-out of cells out of the queue buffers in the cell switch 22 and shapers 66–70 assigned to the system ONE. The CPU 224 writes interim data in the working RAM 226 during processing. Further, the CPU 224 sends control signals to the systems ZERO and ONE via the interface 228 in order to execute the processing stated previously.

If desired, the controller 12 may be implemented by a CISC (Complex Instruction Set Computer) or an RISC (Reduced Instruction Set Computer).

Figure 15A:
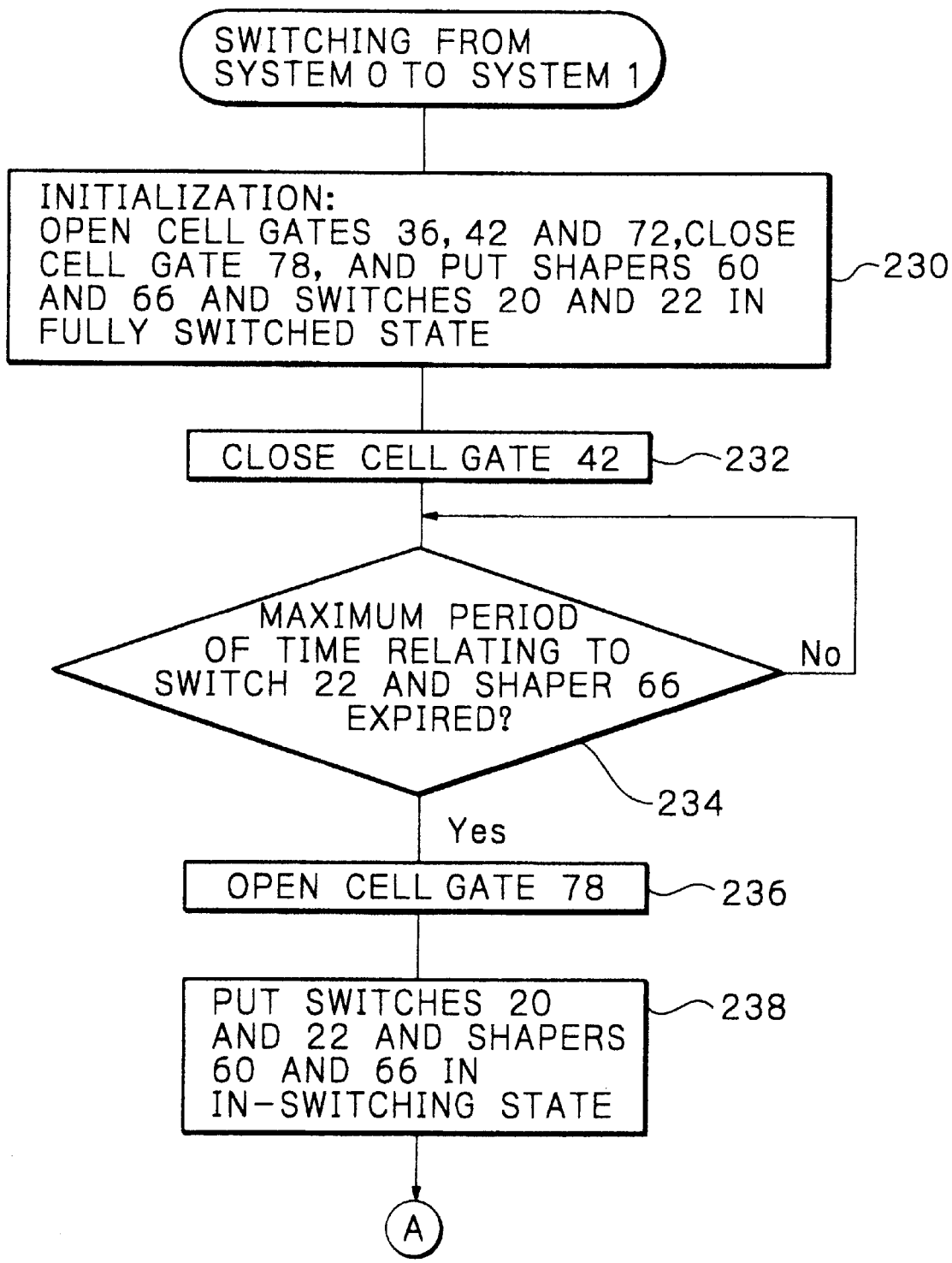
FIGS. 15A and 15B are flowcharts demonstrating a specific operation of the first embodiment.
Figure 15B:
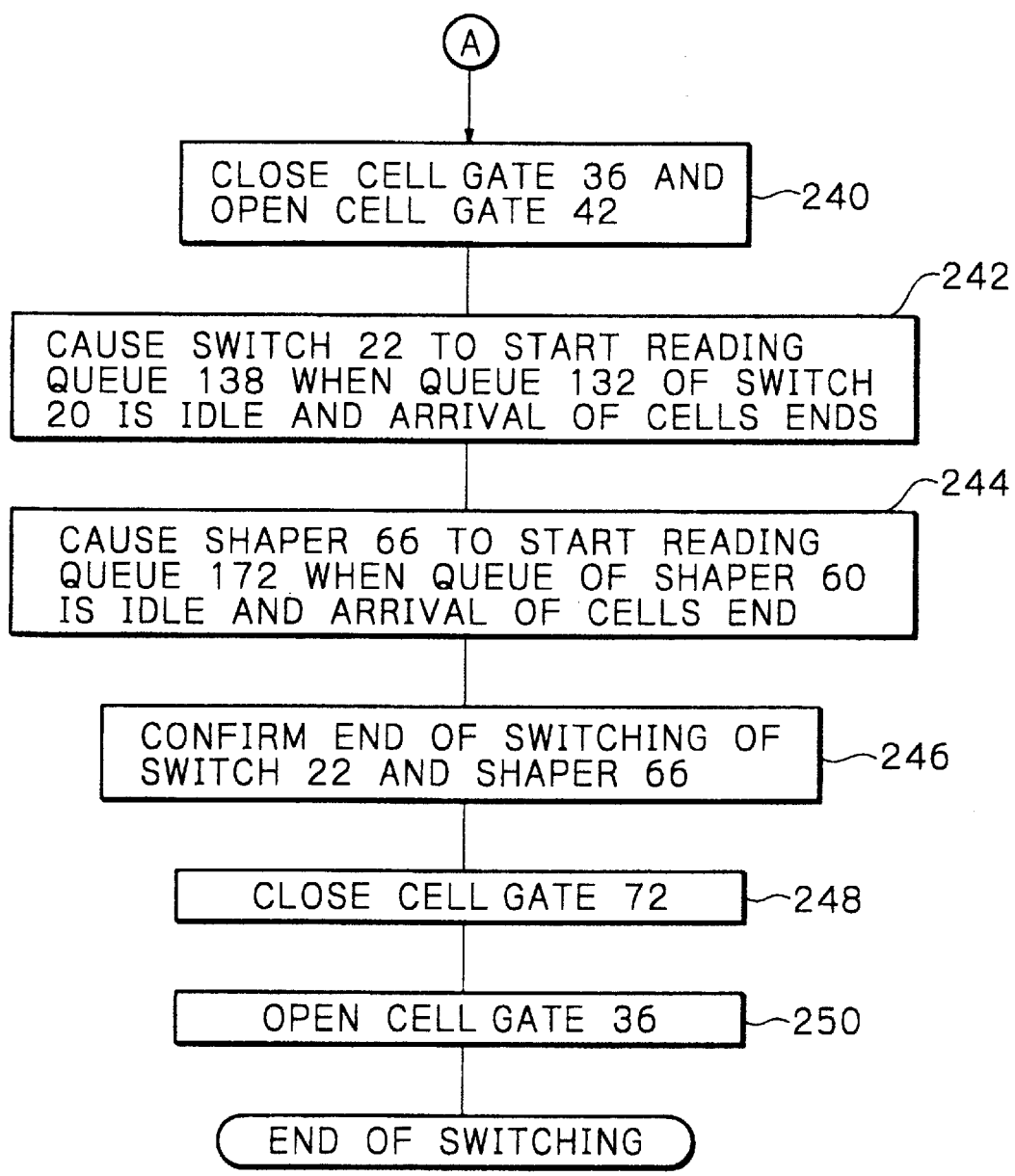

Reference will be made to FIGS. 15A and 15B for describing a specific operation of the cell switching device shown in FIGS. 1A and 1B. Assume that the systems ZERO and ONE are respectively rendered active and standby by way of example, and that hit-less switching is executed from the system ZERO to the system ONE between the input line 2 and the output line 14. Further, for the simplicity of description, assume that cells input via the input line 2 are routed through the input cell gates 36 and 42 and the queue buffers in the cell switches 20 and 22 to the shapers 60 and 66.

As shown, the controller 12 first initializes the cell switching circuitry 8 and 10 belonging to the systems ZERO and ONE, respectively (step 230). Specifically, the controller 12 sets up a condition wherein the same cell sequence can be input to both of the systems ZERO and ONE and can be passed through the input cell gate 36 and output cell gate 72 of the system ZERO. At the same time, the controller 12 makes the input cell gate 42 of the system ONE ready to pass input cells therethrough. In this manner, the cell switches 20 and 22 and the shapers 60 and 66 are operable in a manner as close to each other as possible.

On the other hand, the controller 12 closes the output cell gate 78 of the system ONE, so that the cell gate 78 will deliver null cells to the OR gate 84. Further, the controller 12 puts the cell switches 20 and 22 and shapers 60 and 66 in a fully switched condition.

After the step 230, the controller 12 closes the input cell gate 42 in the system ONE (step 232). Subsequently, to evacuate the queue buffer 138 of the selector 96 and the queue buffer 172 in the shaper 66 both belonging to the system ONE, the controller 12 determines whether or not a maximum period of time necessary for a cell to pass through the cell switch 22 and shaper 66 has expired (step 234). If the answer on the step 234 is positive (Yes), then the controller 12 opens the output cell gate 78 (step 236). Alternatively, in the step 234, the controller 12 may directly check the queue buffer 138 in the selector 96 and the queue buffer 172 in the shaper 66 to see if they are idle or not, in which case the step 236 will be executed when they become idle.

In the above condition, cells read out of the queue buffer 138 in the selector 96 and the queue buffer 172 in the shaper 66 can be applied to the OR gate 84 (step 236).

Subsequently, the controller 12 puts the cell switches 20 and 22 and shapers 60 and 66 in the previously mentioned in-switching condition (step 238). Specifically, the controller 12 commands the input cell gates 36 and 42 to operate contrarily to each other and causes the queue buffers in the cell switch 22 and shaper 66 to sequentially replace the queue buffers in the cell switch 20 and shaper 60. More specifically, the controller 12 closes the input cell gate 36 in order to prevent it, i.e., the system ZERO from taking in cells. At the same time, the controller 12 opens the input cell gate 42 in order to allow it, i.e., the system ONE to take in cells (step 240).

Assume that after the step 240 the controller 12 determines that the queue buffer 132 in the selector 90 included in the cell switch 20 has been evacuated, and that the arrival of cells has ended. Then, the controller 12 causes the selector 96 included in the cell switch 22 to start reading cells out of its queue buffer 138 (step 242). This is executed by autonomous hardware processing between the control circuit 134 of the selector 90 and the control circuit 136 of the selector 96.

When the controller 12 determines that the queue buffer 168 in the shaper 60 included in the system ZERO has been evacuated, and that the arrival of cells has ended, the controller 12 causes the shaper 66 in the system ONE to start reading cells out of its queue buffer 172 (step 244). This is also executed by autonomous hardware processing between the control circuit 166 of the shaper 60 and the control circuit 170 of the shaper 66.

After the step 244, the controller 12 confirms the end of switching from the cell switch 20 and shaper 60 in the system ZERO to the cell switch 22 and shaper 66 in the system ONE (step 246). Then, significant or usual cells output from the cell gate 78 are fed to the OR gate 84. The controller 12 closes the output cell gate 72 in the system ZERO and causes it to feed null cells to the OR gate 84 (step 248). Subsequently, the controller 12 opens the input cell gate 36 in the system ZERO (step 250) and thereby makes it ready to take in cells. The OR gate 84 delivers the significant cells output from the cell gate 78 to the output line 14. By the procedure described above, the active system is switched from the system ZERO to the system ONE in a hit-less fashion.

The above description has concentrate on hit-less switching executed from the system ZERO to the system ONE between the input line 2 and the output line 4. In practice, such hit-less switching is executed with all of the input lines 2, 4 and 6 at the same time for cells to be delivered therefrom to the output line 14. This is also true with the other output lines 16 and 18.

FIGS. 16A, 16B and 16C demonstrate more specifically the interlocked relation between the queue buffers 132 and 138 of the selectors 90 and 96, respectively, and the interlocked relation between the queue buffers 168 and 172 in the shapers 60 and 66, respectively. In the following description, assume that an input cell sequence is input to both of the systems ZERO and ONE at substantially a constant rate.

FIG. 16A shows a condition just before switching from the active system ZERO to the standby system ONE. As shown, each of the queue buffers 132 and 168 in the selector 90 and shaper 60, respectively, included in the active system ZERO stores cells. On the other hand, the queue buffers 138 and 172 in the selector 96 and shaper 66, respectively, included in the standby system ONE store no cells. The condition shown in FIG. 16A occurs just before the step 240, FIG. 15B, is executed.

FIG. 16B shows a condition derived from the step 242 shown in FIG. 15B. As shown, the number of cells stored in the queue buffer 132 in the selector 90 sequentially decreases due to the operation of the selector 90 contrary to the operation of the selector 96. On the other hand, because cells are input to the systems ZERO and ONE at substantially a constant rate, cells are sequentially written to the queue buffer 138 in the selector 96 in accordance with the rate. When the queue buffer 132 in the selector 90 is evacuated, switching from the queue buffer 132 to the queue buffer 138 completes.

When the arrival of cells at the cell switch 20 of the system ZERO ends, the number of cells stored in the queue buffer 168 in the associated shaper 60 sequentially decreases. On the other hand, cells are sequentially stored in the queue buffer 172 in the shaper 66 belonging to the system ONE. FIG. 16C shows a condition wherein the queue buffer 168 is evacuated, i.e., switching from the queue buffer 168 to the queue buffer 172 has completed. This condition is set up by the step 244 shown in FIG. 15B.

By the above procedure, the cell switch 10 of the system ONE is substituted for the cell switch 8 of the system ZERO as an active cell switch in a hit-less manner. Further, the size or the capacity of the queue buffers does not have to be increased because of the control over the cell gates controlling the passage of cells and the control over the read-out from the queue buffers included in the cell switch 20 and shaper 60. Moreover, the statuses of the queue buffers of the cell switches and the statuses of the queue buffers in the shapers are matched by hardware, so that the number of signals to be interchanged is successfully reduced. In addition, the switching procedure described with reference to FIGS. 15A and 15B can be implemented by the software and firmware installed in the controller 12.

In the illustrative embodiment, the queue buffers in the cell switches 20 and 22 are switched by the interruption of read-out. In practice, however, the interruption of read-out is sometimes difficult due to the structure of an LSI (Large Scale Integrated circuit), or such control is sometimes practically impossible due to the use of a conventional LSI. Assume that the cell switches 20 and 22 are controlled by a fully simple order, and that an identical input cell sequence is applied to the duplex systems ZERO and ONE. Then, it is possible to fully match cell sequences to be output from the cell switches 20 and 22 after confirming he evacuation of the queue buffers in the systems ONE and ZERO.

Hereinafter will be described a second embodiment of the present invention capable of implementing hit-less switching based on the above concept.

Second Embodiment

Figure 17B:
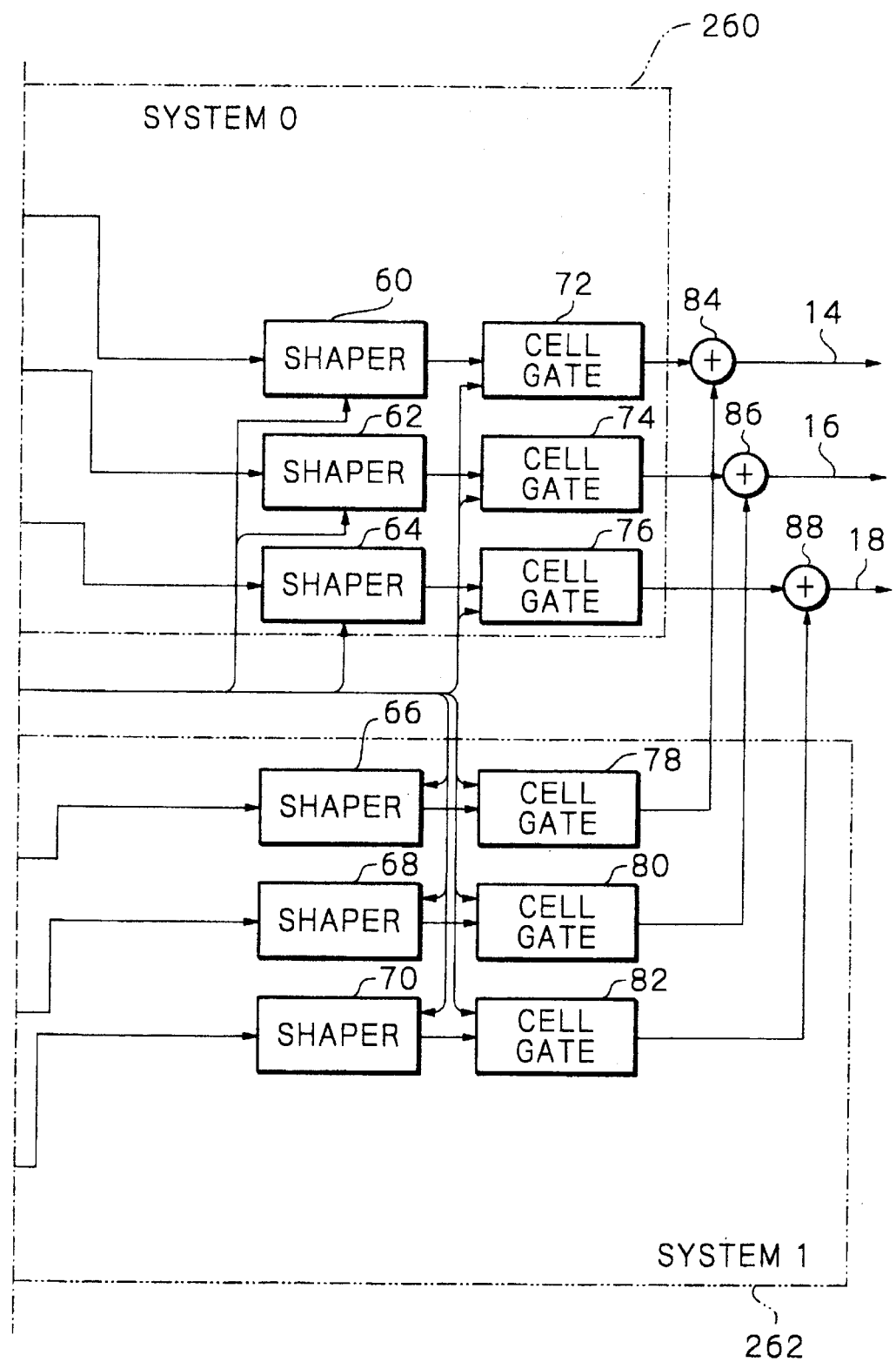

A second embodiment of the present invention will be described with reference to FIGS. 17A and 17B. Briefly, this embodiment defines particular cell formats within the cell switching device, i.e., causes the active system and standby system to respectively output active cells and standby cells in response to input cells. In FIGS. 17A and 17B, structural elements like the structural elements shown in FIGS. 1A–16C are designated by the same reference numerals, and a detailed description thereof will not be made in order to avoid redundancy.

As shown in FIGS. 17A and 17B, the cell switching device is generally made up of cell switching circuitry 260 and 262 assigned to the system ZERO and system ONE, respectively. The circuitry 260 is identical with the circuitry 8, FIGS. 1A and 1B, except that it includes ACT/STBY (Active/Standby) converters 264, 268 and 270 in place of the cell gates 36, 38 and 40. Likewise, the circuitry 262 is identical with the circuitry 10, FIGS. 1A and 1B, except that it includes ACT/STBY converters 272, 274 and 276 in place of the cell gates 42, 44 and 46. The ACT/STBY converter 264, for example, included in the system ZERO receives input cells via the input line 2 and converts the input cells to active cells when it is active or converts them to standby cells when it is standby.

Some different schemes are available for the conversion of input cells to active cells or standby cells. For example, a pattern of a preselected number of bits representative of an active cell and a pattern of a preselected number of bits representative of a standby cell may be selectively set in the header of an input cell. Alternatively, an active flag and a standby flag may be selectively added to the header of an input cell.

Standby cells output from the ACT/STBY converter 264 are passed through the cell switch 20, but discarded by the shaper 60. On the other hand, active cells are routed through the cell switch 20, shaper 60, cell gate 72 and OR gate 84 to the output line 14.

The ACT/STBY converters 268 and 270 respectively receive input cells via the input lines 4 and 6, and each transforms the respective input cells to active cells or standby cells. The ACT/STBY converters 272, 274 and 276 belonging to the system ONE respectively operate in the same manner as the ACT/STBY converters 264, 268 and 270 belonging to the system ZERO.

Figure 18:
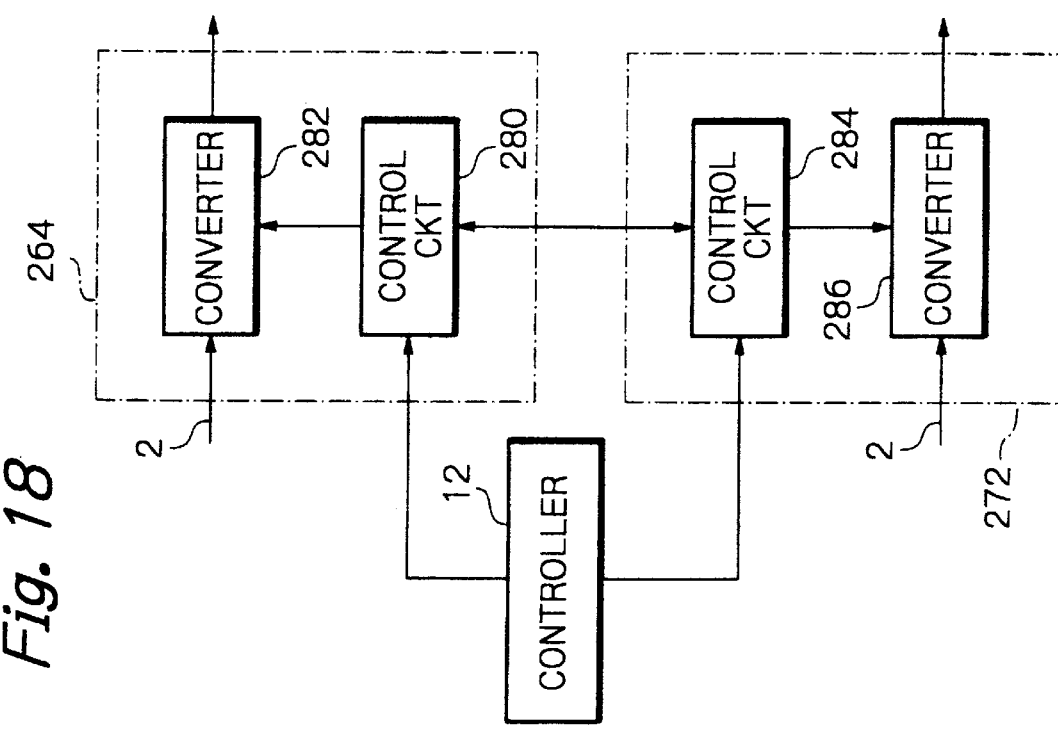

FIG. 18 shows a specific configuration of the ACT/STBY converter 264 and that of the ACT/STBY converter 272, a relation between the converters 264 and 272, and a relation between the converters 264 and 272 and the controller 12. As shown, the ACT/STBY converter 264 has a control circuit 280 and a conversion circuit 282 while the ACT/STBY converter 272 has a control circuit 284 and a conversion circuit 286. The controller 12 feeds a control signal to each of the ACT/STBY converters 264 and 272 for making it active or standby, as needed.

In response to the control signal, the control circuit 280 of the ACT/STBY converter 264 causes the conversion circuit 282 to convert input cells to active cells when it is active or to convert them to standby cells when it is standby. Further, when the system ZERO is active, the control circuit 280 interchanges signals with the control circuit 284 of the ACT/STBY converter 272 such that the control circuit 284 causes the conversion circuit 286 to output standby cells. When the system ZERO is standby, the control circuit 280 interchanges signals with the control circuit 284 such that the control circuit 284 causes the conversion circuit 286 to output active cells.

Figure 19:
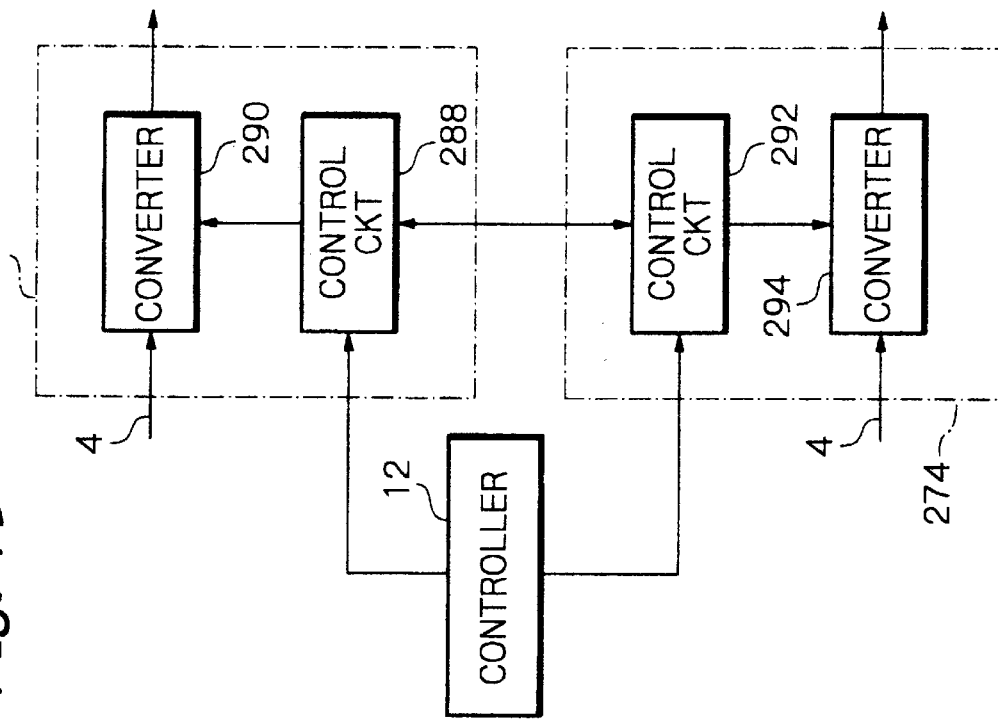
FIGS. 18–20 are schematic block diagrams each showing specific configurations of particular active/standby converters included in the second embodiment, a relation between the converters, and a relation between the converters and a control circuit.
Figure 20:
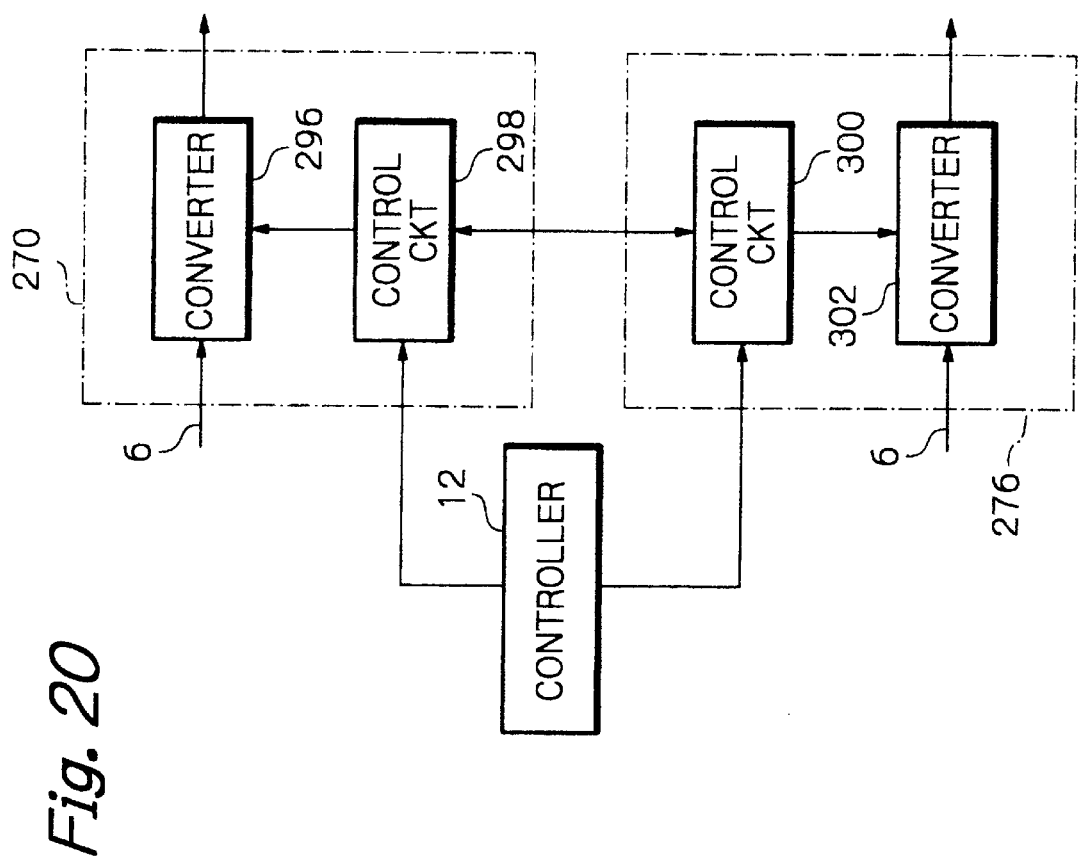

FIG. 19 shows a specific configuration of the ACT/STBY converter 268 and that of the ACT/STBY converter 274, a relation between the converters 268 and 274, and a relation between the converters 268 and 274 and the controller 12. As shown, the ACT/STBY converter 268 has a control circuit 288 and a conversion circuit 290 while the ACT/STBY converter 274 has a control circuit 292 and a conversion circuit 294. FIG. 20 shows a specific configuration of the ACT/STBY converter 270 and that of the ACT/STBY converter 276, a relation between the converters 270 and 276, and a relation between the converters 270 and 276 and the controller 12. As shown, the ACT/STBY converter 270 has a control circuit 298 and a conversion circuit 296 while the ACT/STBY converter 276 has a control circuit 300 and a conversion circuit 302. The ACT/STBY converters 268, 274, 270 and 276 are identical in configuration and operation with the ACT/STBY converters 264 and 272, FIG. 18, and will not be described specifically in order to avoid redundancy.

Figure 21A:
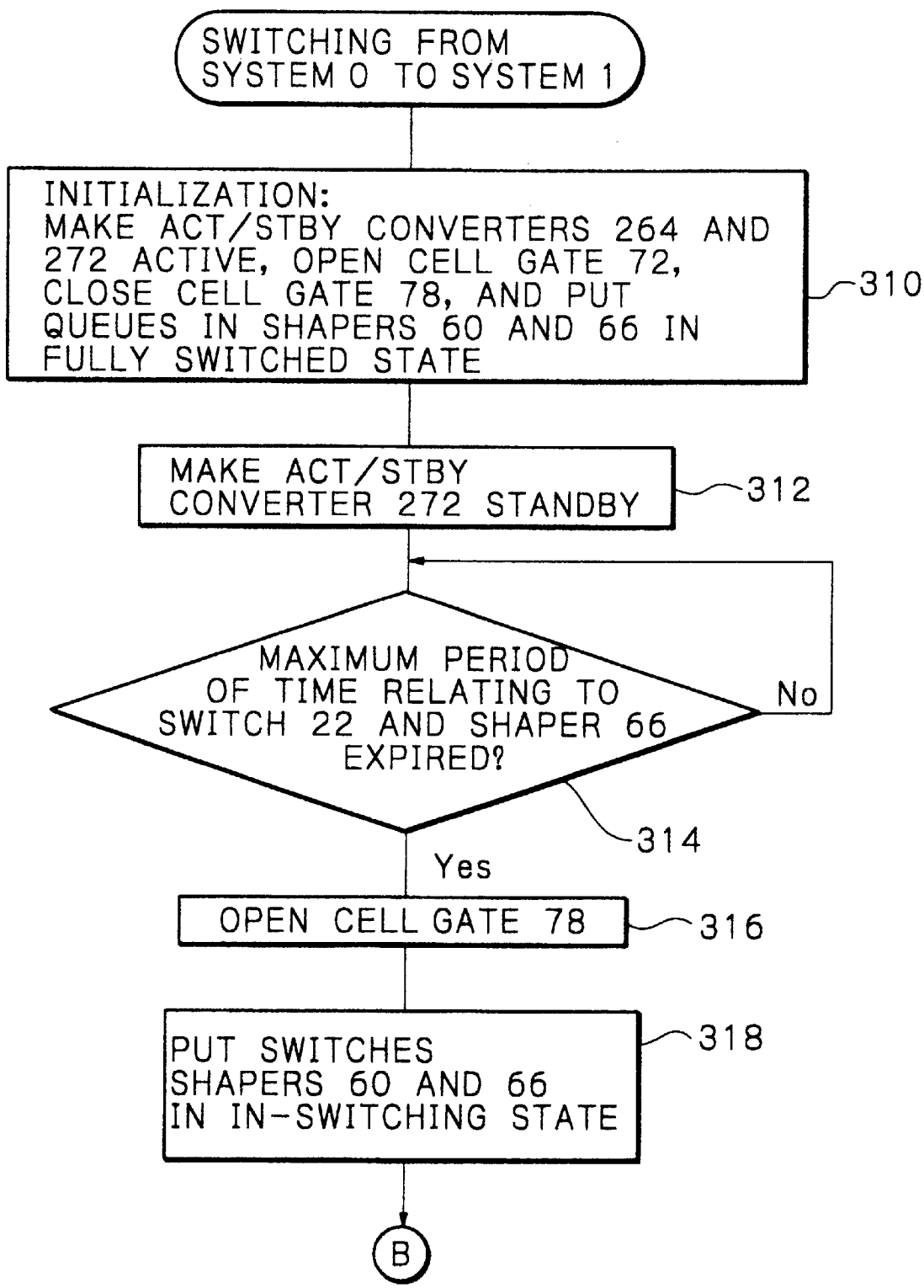
FIGS. 21A and 21B are flowcharts demonstrating a specific operation of the second embodiment.
Figure 21B:
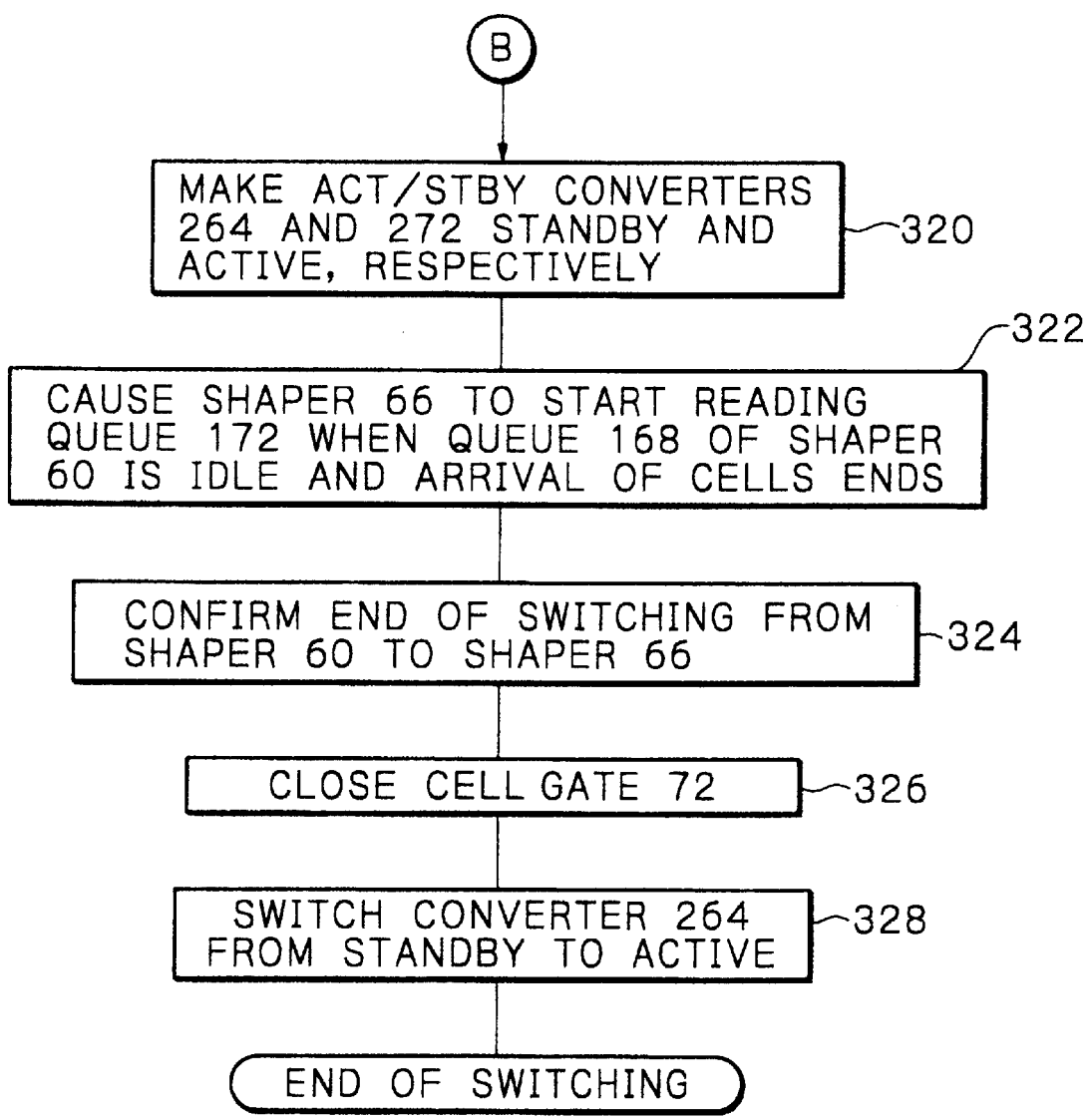

Reference will be made to FIGS. 21A and 21B for describing a specific operation of the cell switching device shown in FIGS. 17A and 17B. Again, assume that the systems ZERO and ONE are respectively made active and standby by way of example, and that hit-less switching is executed from the system ZERO to the system ONE between the input line 2 and the output line 14. Further, for the simplicity of description, assume that cells input via the input line 2 are routed through the ACT/STBY converter 264, cell switch 20 and shaper 60 and through the ACT/STBY converter 272, cell switch 22, and shaper 66.

As shown in FIGS. 21A and 21B, the controller 12 first initializes the cell switches 260 and 262 belonging to the systems ZERO and ONE, respectively (step 310). Specifically, the controller 12 sets up a condition allowing the same cell sequence to be input to both of the systems ZERO and ONE, and conditions the ACT/STBY converters 264 and 272 for the output of active cells. At the same time, the controller 12 opens the output cell gate 72 in the system ZERO while closing the output cell gate 78 in the system ONE. In addition, the controller 12 puts the queue buffers 168 and 172 in the shapers 60 and 66, respectively, in a fully switched state. In this condition, the cell switches 20 and 22 and shapers 60 and 66 are respectively operable in a manner as close to each other as possible.

Subsequently, the controller 12 conditions the ACT/STBY converter 272 in the system ONE for the output of standby cells (step 312). Then, to evacuate the queue buffer 172 in the shaper 66, the controller 12 determines whether or not a maximum period of time necessary for a cell to pass through the shaper 66 has expired (step 314). If the answer on the step 314 is Yes, then the controller 12 opens the output cell gate 78 in the system ONE (step 316). Again, the controller 12 may directly check the queue buffer 172 in the shaper 66 to see if it is idle or not, in which case the step 316 will be executed when it becomes idle.

In the above condition, cells read out of the queue buffer 172 in the shaper 66 can be applied to the OR gate 84 (step 316).

Subsequently, the controller 12 puts the shapers 60 and 66 in an in-switching state (step 318). Specifically, the controller 12 commands the ACT/STBY converters 264 and 272 to operate contrarily to each other and causes the queue buffer in the shaper 66 to sequentially replace the queue buffer in the shaper 60. More specifically, the controller 12 makes the ACT/STBY converter 272 in the system ONE active for outputting active cells (step 320).

Assume that after the step 320 the controller 12 determines that the queue buffer 168 in the shaper 60 has been evacuated, and that the arrival of cells has ended. Then, the controller 12 causes the shaper 66 to start reading cells out of the queue buffer 172 (step 322). This is also executed by autonomous hardware operation between the control circuit 166 of the shaper 60 and the control circuit 170 of the shaper 66.

After the step 322, the controller 12 confirms the end of switching from the shaper 60 in the system ZERO to the shaper 66 of the system ONE (step 324). Then, active cells output from the cell gate 78 in the system ONE are fed to the OR gate 84. The controller 12 closes the output cell gate 72 in the system ZERO, which is now standby, and thereby causes the system ZERO to apply standby cells to the OR gate 84 in place of active cells (step 326). Subsequently, the controller 12 switches the ACT/STBY converter 264 in the system ZERO from the standby cell output state to the active cell output state (step 328). The OR gate 84 delivers active cells output from the cell gate 78 to the output line 14. By the procedure described above, hit-less switching from the system ZERO to the system ONE is completed.

While the above description has concentrate on hit-less switching from the system ZERO to the system ONE between the input line 2 and the output line 4, such switching is, in practice, executed with all of the input lines 2, 4 and 6 at the same time for cells to be delivered to the output line 14. This is also true with the other output lines 16 and 18.

The illustrative embodiment makes it needless for the controller 12 to control the cell switches 20 and 22 and thereby simplifies the control procedure. In addition, the embodiment reduces limitations on an LSI for implementing the cell switches 20 and 22. A difference in delay corresponding to several cells may occur between the cell switching circuitry 260 and 262 for structural reasons. The contrary operations of the two circuitry 260 and 262 can be guaranteed in spite of such a difference only if the shapers 66, 68 and 70 in the ONE system are so configured as to make the decision on the end of cell input to the queue buffers in the system ONE by adding the above difference to the delay. In this case, although the size of each queue buffer must be increased by several cells, the resulting queue size is not critical in practice.

Now, shapers may be required to precede the cell switches, depending on the situation. For example, assume that a terminal connected to the cell switching device is of the kind causing the cell rate to sharply increase and decrease. Then, shapers must be used to adjust intervals between consecutive cell transfers. A third embodiment to be described hereinafter is constructed to effect hit-less switching, taking account of the above situation as well.

Third Embodiment

Figure 22A:
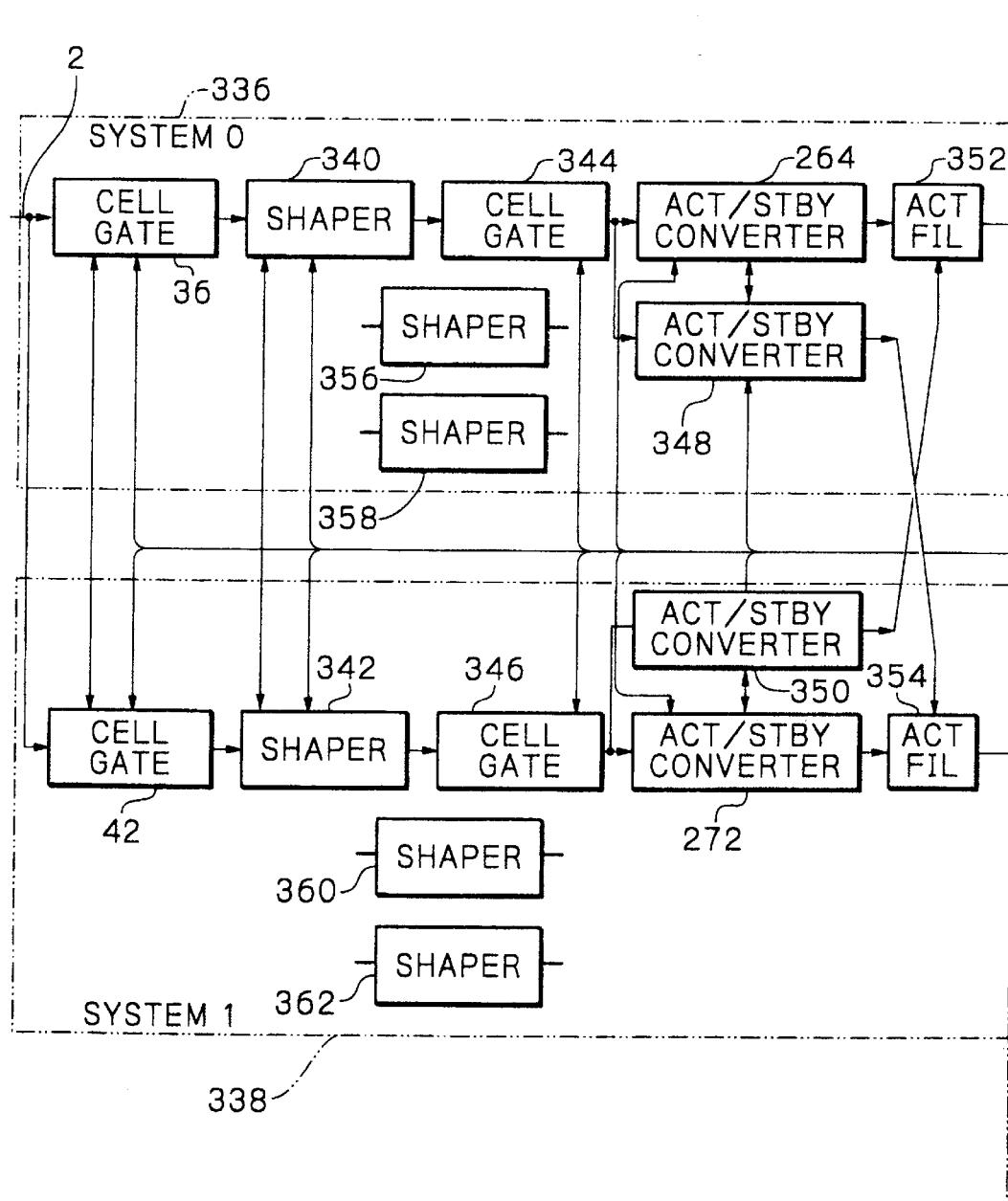
FIGS. 22A and 22B are combined.
Figures 22, 22B:
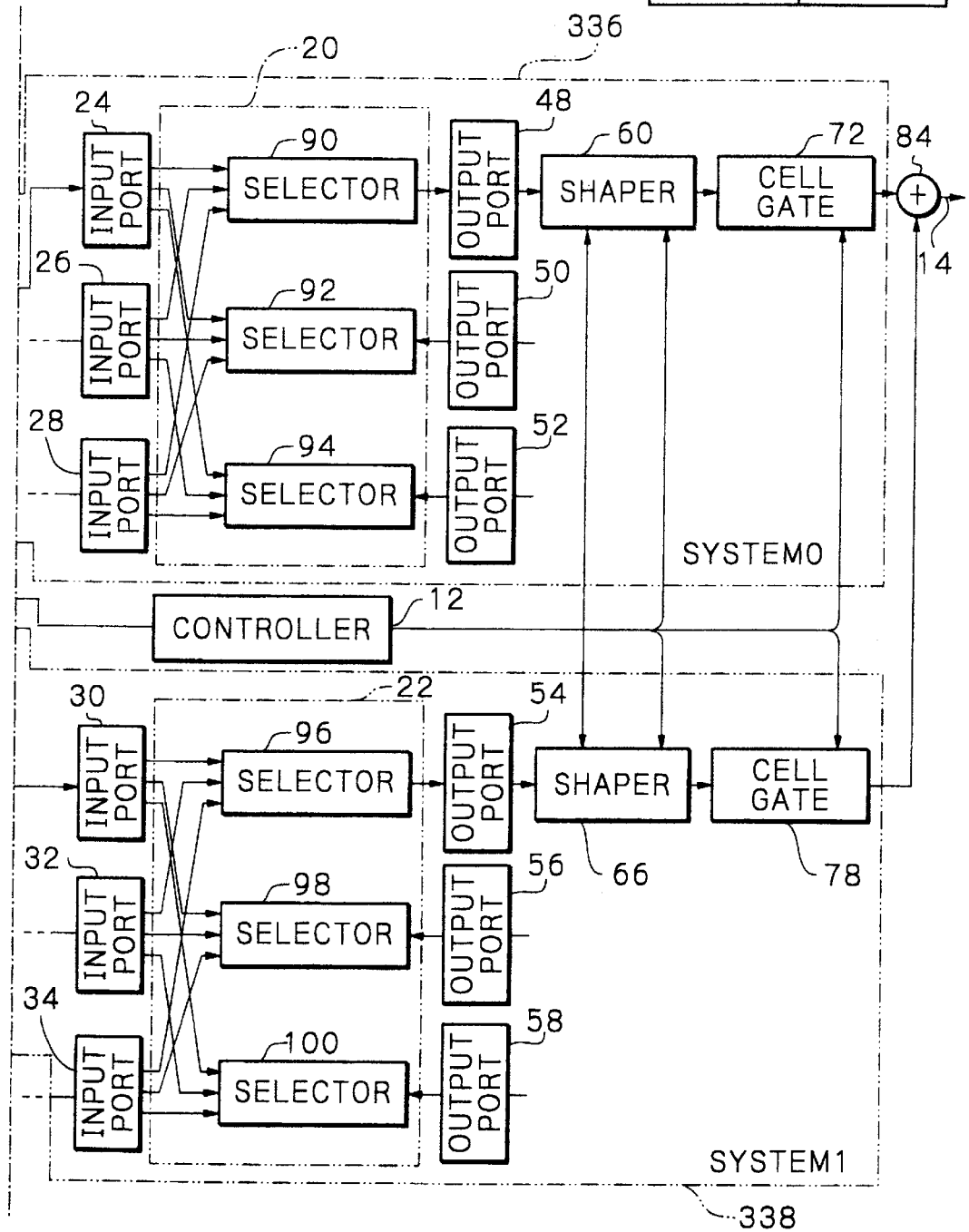
FIG. 22 shows how

A third embodiment of the present invention will be described with reference to FIGS. 22A and 22B. In FIGS. 22A and 22B, structural elements similar to the structural elements shown in FIG. 1A–21B are designated by the same reference numerals and will not be described specifically in order to avoid redundancy.

As shown, a cell switching device is generally made up of cell switching circuitry 336 and 338 assigned to the system ZERO and system ONE, respectively Cells received via the input line 2 are applied to the input cell gates 36 and 42 included in the cell switching circuitry 336 and 338, respectively. It would be impossible to effect hit-less switching from the system ZERO to the system ONE by connecting an input shaper 340 included in the system ZERO to the cell switch 20 and extending the concept of the interlocked operation of FIGS. 16A–16C for switching the path extending from the input shaper 340 to the output shaper 60 via the cell switch 20. This will be described specifically hereinafter.

The cell switch 20, for example, included in the system ZERO receives cells from the queue buffer in the input shaper 340 and the queue buffers in input shapers 356 and 358 also included in the system ZERO. The switching time is not fully coincident between the input shapers 340–358. This is also true with a plurality of shapers 342, 360 and 362 included in the system ONE. Therefore, the cell switches 20 and 22 cannot be switched until cells output from the input shapers latest in switching timing, e.g., cells from the shapers 340 and 342, may arrive last of all at the cell switches 20 and 22, respectively. This will be described with reference also made to FIG. 23.

Figure 23:
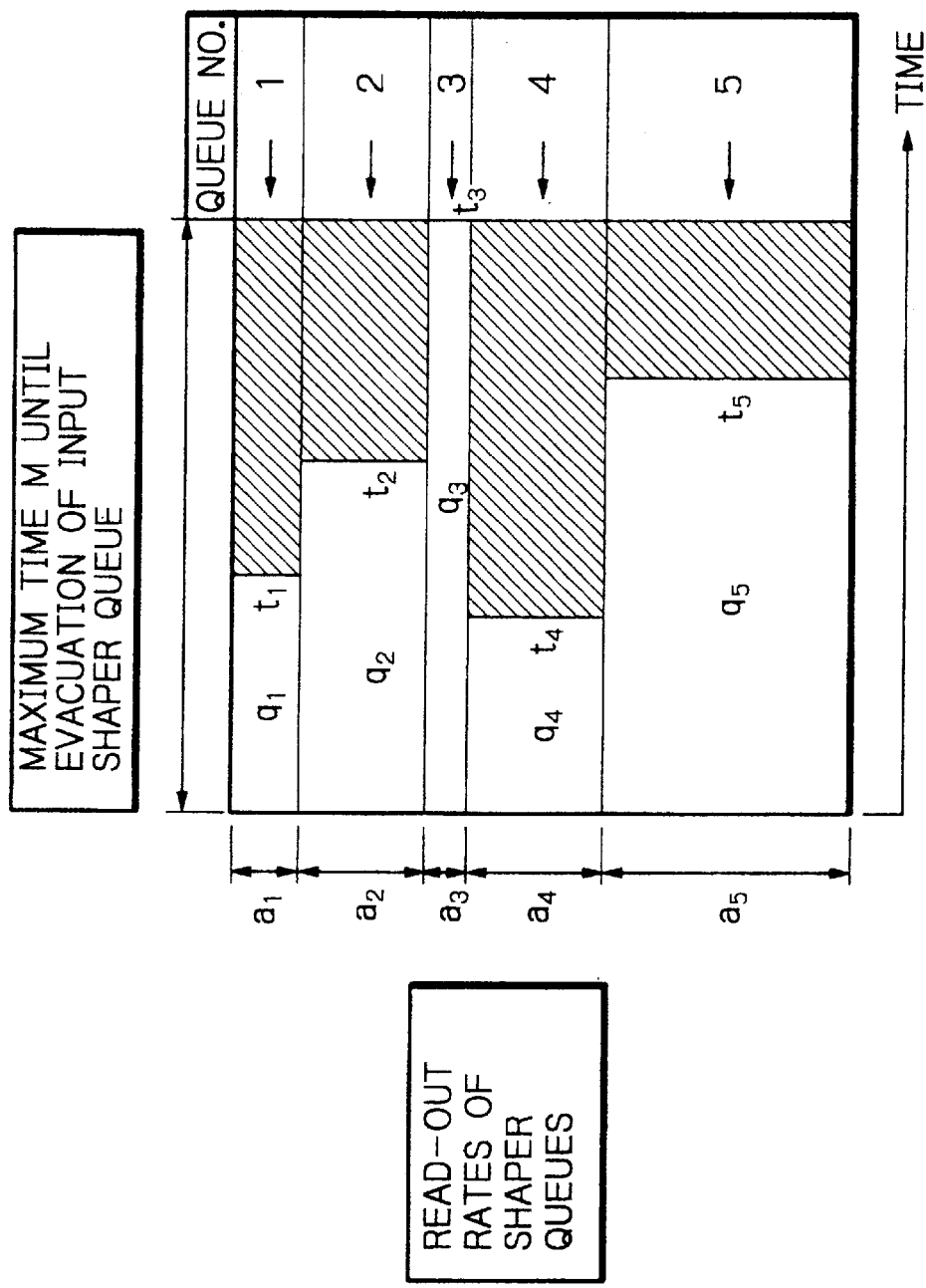
FIG. 23 is a chart showing the amounts of cells which would be stored in the queue buffers of output shapers included in the third embodiment if systems ZERO and ONE were not interconnected.

Assuming that the two systems ZERO and ONE are not interconnected with the crossing lines, FIG. 23 shows the amounts or numbers of cells stored in shaper queue buffers preceding the cell switch 20 and expected to send the cells to shaper queue buffers following the cell switch 20. As shown, five queue buffers #1 through #5 are connected from the input shapers 340, 356 and 358 to the cell switch 20 by way of example. Assume that the numbers of cells present in the queue buffers #1 through #5 at the beginning of switching are respectively q1, q2, q3, q4 and q5, and that the queue buffers #1 through #5 have constant read-out rates of a1, a2, a3, a4 and a5, respectively. FIG. 23 shows how many cells are written into each queue buffer in the cell switch 20 belonging to the system ZERO. There holds an expression representing the period of time ti required for completing the evacuation of the queue buffer #1:

$$ti = qi/ai (i=1, 2, 3, 4 \text{ or } 5)$$

The switching of cells begins at the same time in all of the queue buffers. However, the numbers of cells represented by hatched areas in FIG. 23 (expected to accumulate in the queue buffers of the substitute cell switch) arrive from the queue buffers in the shapers switched before the others, until the cell switch 20 has been switched. In FIG. 23, blank areas, as distinguished from the hatched areas, are representative of the amount of the cells remaining in the queue buffers in the shapers at the beginning of switching.

The arrival of cells represented by the hatched areas in FIG. 23 would noticeably increase the load on the shaper queue buffers in the substitute cell switch, e.g., the shaper 66. This would require a queue buffer size far greater than the usual queue buffer size and would therefore be difficult to practice and would increase the cost.

In the light of the above, the side preceding the cell switches and the side following the same may be interconnected and switched independently of each other, as shown in FIGS. 22A and 22B. It is to be noted that this embodiment is not constructed to interrupt the read-out from the queue buffers in the cell switches 20 and 22.

As shown in FIGS. 22A and 22B, cell gates 344 and 346, the ACT/STBY converters 264 and 272, ACT/STBY converters 348 and 350 and active filters (ACT FILs) 352 and 354 are arranged at a portion connecting the two systems ZERO and ONE. The ACT/STBY converters 264 and 348 in the system ZERO are so controlled as to operate contrarily to each other. The ACT/STBY converters 272 and 350 in the system ONE are also controlled to operate contrarily to each other. Control for such contrary operations is executed at the same cell timing with all of the elements connected to a plurality of input ports system by system.

FIG. 24 is a table listing input and output conditions on which the operations of the ACT FILs 352 and 354 are based. As shown, when the ACT FIL 352 or 354 receives two inputs #1 and #2 both of which are active cells, the ACT FIL is inhibited from outputting them or outputs them by queuing based on sequence determination. When the inputs #1 and #2 to the ACT FIL 352 or 354 are respectively an active cell and a standby cell or a null cell, the ACT FIL outputs the active cell. When the inputs #1 and #2 are respectively a standby or null cell, and an active cell, the ACT FIL outputs the active cell. When the inputs #1 and #2 are respectively a standby cell and a null cell, the ACT FIL outputs the standby cell. When the inputs #1 and #2 are respectively a null cell and a standby cell, the ACT FIL outputs the standby cell. Further, when both the inputs #1 and #2 are null cells, the ACT FIL outputs the null cell.

In FIGS. 22A and 22B, the circuitry following the ACT FILs 352 and 354 is similar to the circuitry shown in FIGS. 1A and 1B or 17A and 17B. Standby cells output from the ACT FILs 352 and 354 are discarded by the output shapers 60 and 66, respectively.

Figure 25:
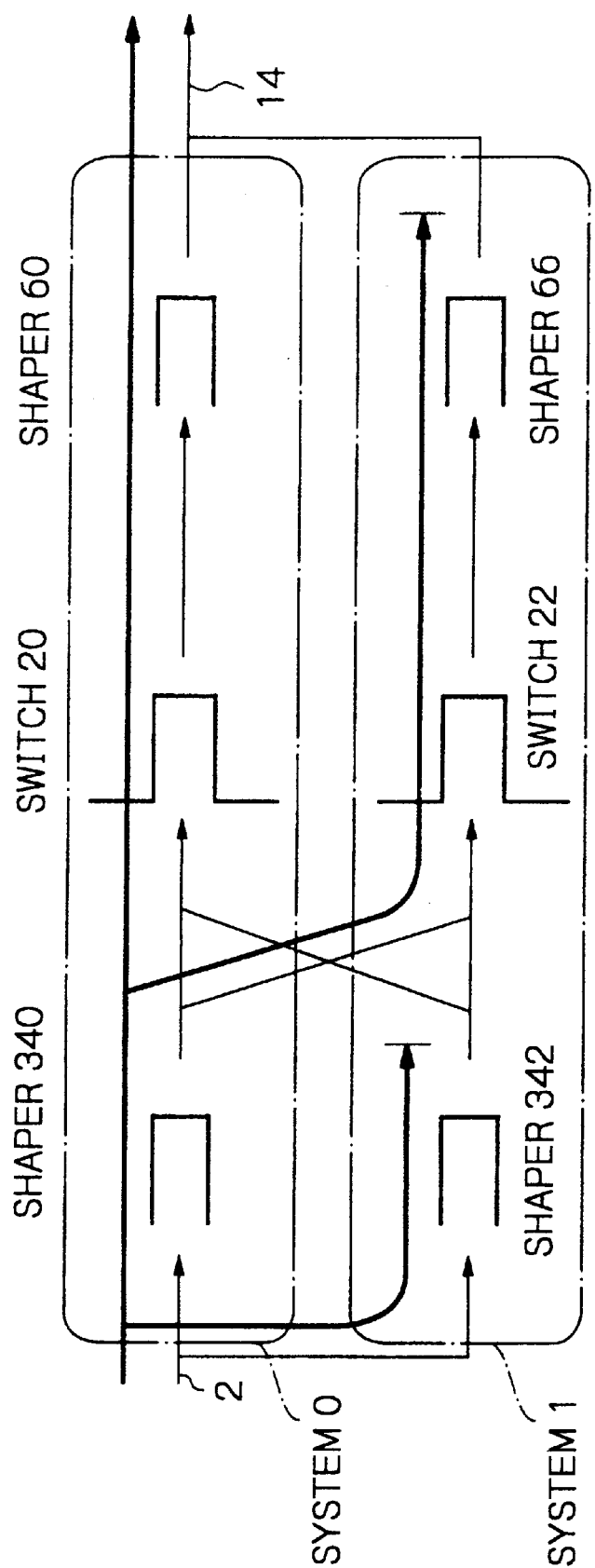
FIGS. 25–27 show how the flow of cells varies in the third embodiment during the course of switching operation.
Figure 26:
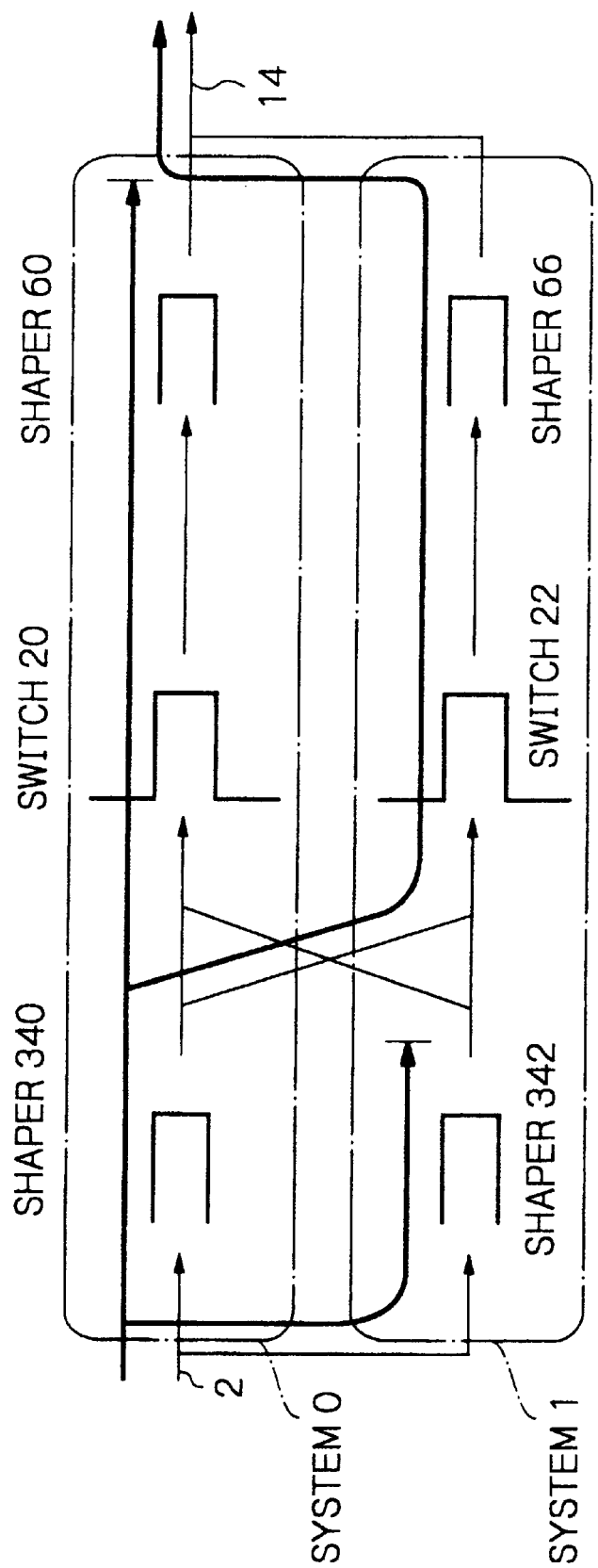
Figure 27:
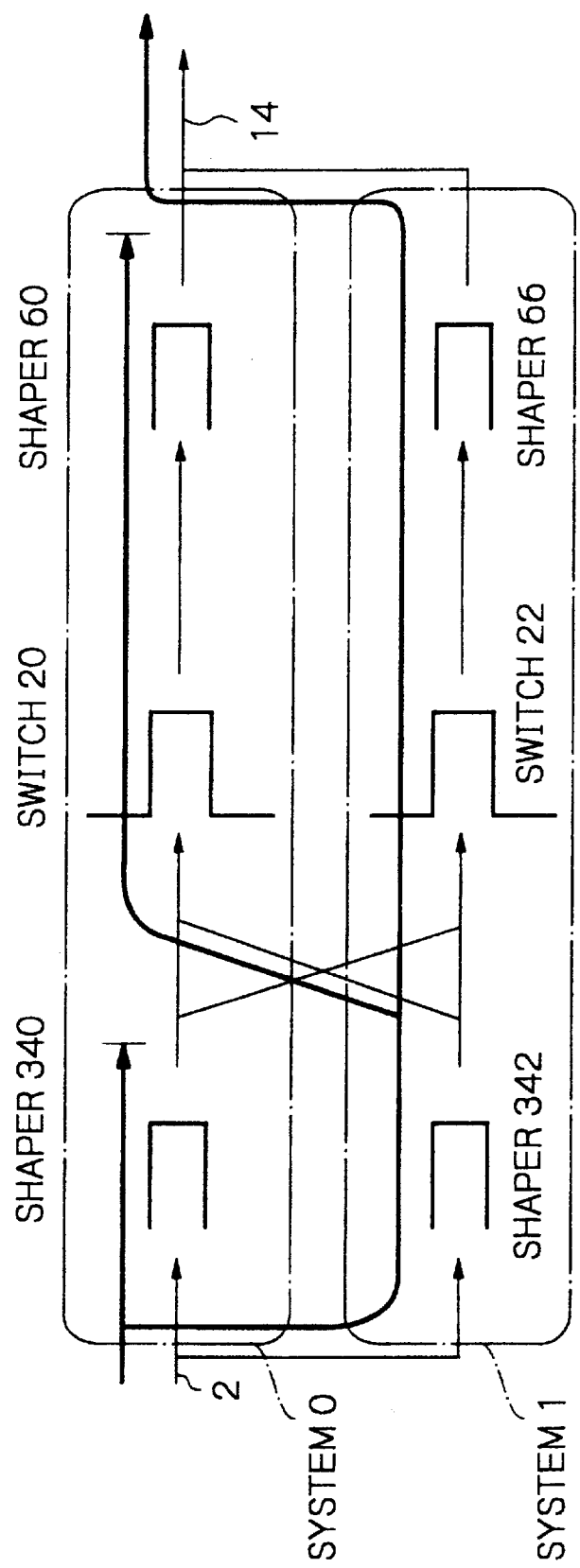

FIGS. 25–27 each shows a particular flow of input cells. When the system ZERO is active, cells flow through paths indicated by bold lines in FIG. 25. At this instant, because the cell gate 346 is closed, the circuitry following the ACT FILs 352 and 354 is similar to the circuitry of FIGS. 1A and 1B or 17A and 17B. At the time of switching from the system ONE to the system ZERO, the cell switches 20 and 22 and the shapers 60 and 66 are switched first. As a result, cells flow through paths indicated by bold lines in FIG. 26. In this case, the ACT/STBY converters 264 and 348 (or ACT/STBY converters 272 and 350 when the systems ONE and ZERO are respectively active and standby) and cell gates 72 and 78 respectively correspond to the cell gates 36, 42, 72 and 78, FIGS. 1A and 1B, and replaced accordingly.

The above switching stage is followed by switching from the input shaper 340 to the input shaper 342. As a result, cells flow through paths indicated by fold lines in FIG. 27. FIG. 28 shows a relation between the cell gates and queue buffers shown in FIGS. 1A and 1B and the cell gates and queue buffers shown in FIGS. 22A and 22B. As shown, the cell gates 36 and 42 shown in FIG. 1A respectively correspond to the cell gates 36 and 42 shown in FIG. 22A. The cell gates 72 and 78 in FIG. 1B respectively correspond to the cell gate 344 and ACT/STBY converters 264 and 348 in FIG. 22A and the cell gate 346 and ACT/STBY converters 272 and 350. The queue buffers provided in the cell switches 20 and 22 and the shapers 60 and 66 in FIGS. 1A and 1B correspond to the queue buffers of the shapers 340 and 342 in FIG. 22A.

Figure 29:
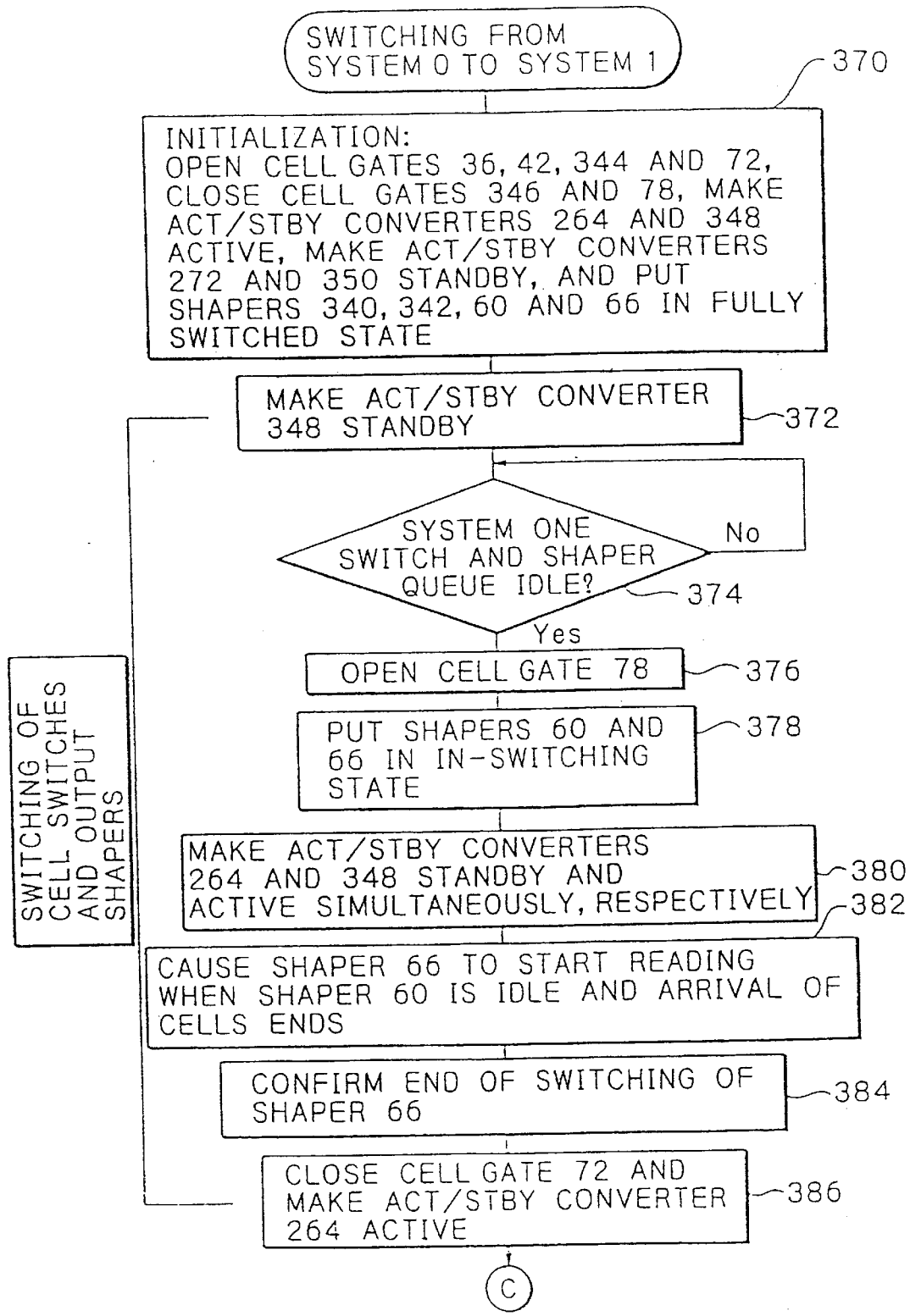
FIGS. 29 and 30 are flowcharts representative of a specific operation of the third embodiment.
Figure 30:
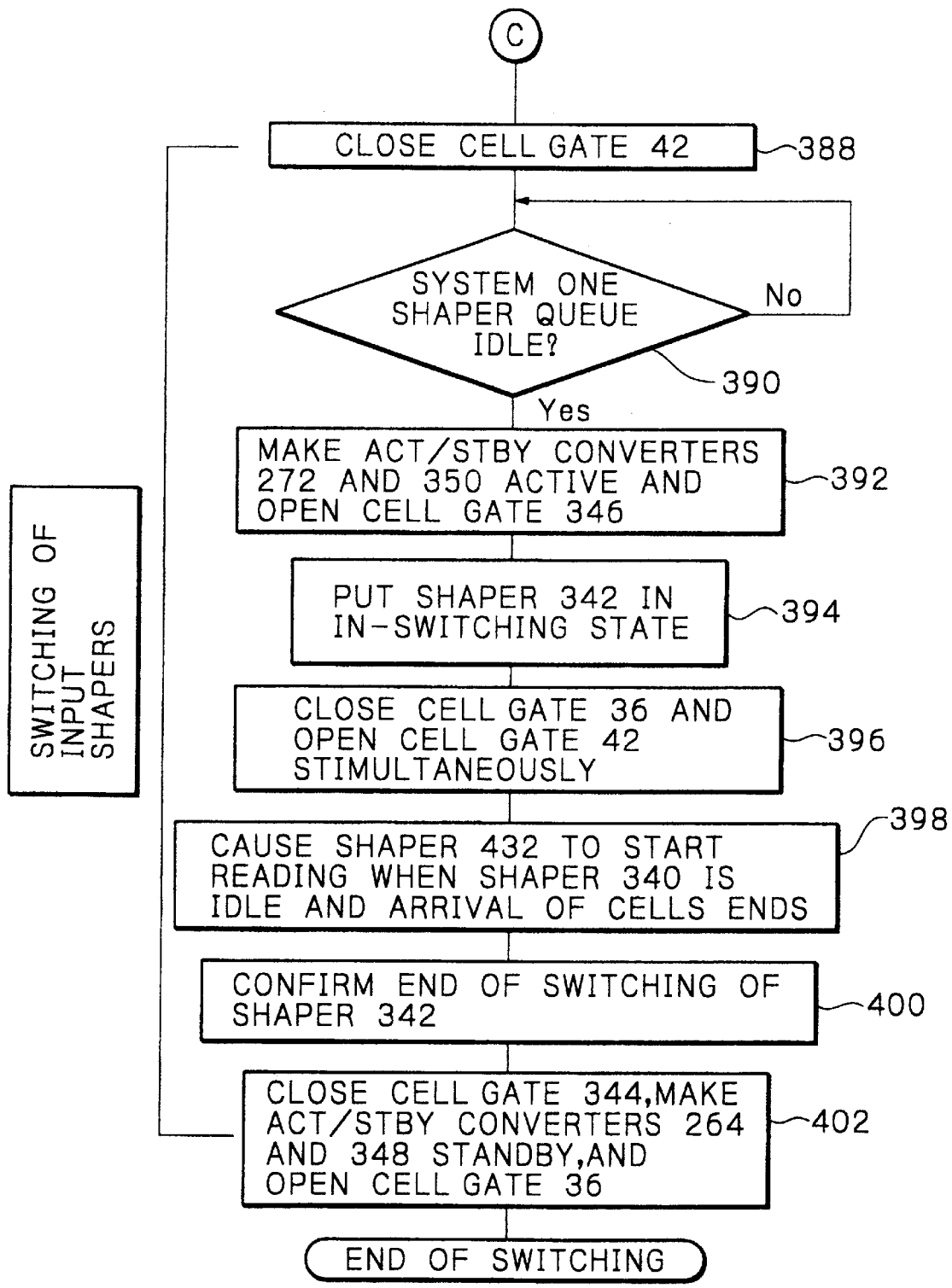

Reference will be made to FIGS. 29 and 30 for describing a specific operation of the illustrative embodiment. As shown, the controller 12 executes initialization first (step 370). Specifically, the controller 12 opens the cell gates 36, 42, 344 and 72 and closes the cell gates 346 and 78. At the same time, the controller 12 conditions the ACT/STBY converters 272 and 350 for the output of active cells while conditioning the ACT/STBY converters 264 and 348 for the output of standby cells. In addition, the controller 12 puts the shapers 340, 342, 60 and 66 in a fully switched condition.

Subsequently, the controller 12 conditions the ACT/STANDBY converter 348 for the output of standby cells in order to switch the cell switch 20 and output shaper 60 belonging to the system ZERO (step 372). The controller 12 waits until the maximum period of time necessary for a cell to go out of the queue buffers in the cell switch 22 and shaper 66 belonging to the ONE system expires, and then determines whether or not those queue buffers have been evacuated (step 374). If the answer on the step 374 is Yes, the controller 12 opens the cell gate 78 and puts the shapers 60 and 66 in the in-switching state (step 378).

After the step 378, the controller 12 conditions the ACT/STBY converter 264 for the output of standby cells and conditions the ACT/STBY converter 348 for the output of active cells (step 380). If the output shaper 60 is idle and if the arrival of cells has ended, the controller 12 causes cells to be read out of the queue buffer in the shaper 66 by autonomous hardware operation (step 382). On confirming the end of switching of the shaper 66 (step 384), the controller 12 closes the output cell gate 72 and conditions the ACT/STBY converter 264 for the output of active cells (step 386). This is the end of the first switching stage, i.e., switching from the cell switch 20 and output shaper 60 in the system ZERO to the cell switch 22 and output shaper 66 in the system ONE.

Next, to replace the input shaper 340 in the system ZERO with the input shaper 342 of the system ONE, the controller 12 first closes the input cell gate 42 in the system ONE (step 388). On the elapse of the maximum period of time necessary for a cell to pass through the input shaper 342, the controller 12 determines whether or not the queue buffer of the shaper 342 has been evacuated (step 390). If the answer on the step 390 is Yes, then the controller 12 conditions the ACT/STBY converter 272 in the system ONE and the ACT/STBY converter 350 for the output of active cells and opens the cell gate 346 in the system ONE (step 392).

After the step 392, the controller 12 puts the input shaper 342 in the system ONE in the in-switching state (step 394). Then, the controller 12 closes the input cell gate 36 in the system ZERO and opens the input cell gate 42 in the system ONE (step 396). When the input shaper 340 in the system ZERO is idle and if the arrive of cells has ended, the controller 12 causes the input shaper 342 in the system ONE to start reading cells (step 398). On confirming the end of switching of the input shaper 342 (step 400), the controller 12 closes the cell gate 344, conditions the ACT/STBY converters 264 and 348 in the system ZERO for the output of standby cells, and opens the input cell gate 36 in the system ONE (step 402). As a result, switching is also effected from the input shaper 340 to the input shaper 342, completing switching from the system ZERO to the system ONE.

With the above construction and operation, the illustrative embodiment is capable of implementing hit-less switching from the system ZERO to the system ONE even when shapers are arranged at the input sides of the cell switches respectively belonging to the systems ZERO and ONE. As for the ATM communication system, the shapers connected to the input of the cell switch are used to control traffic to the cell switch and may be implemented by virtual channel shapers. Also, the shapers connected to the output of the cell switch are used to limit the frequency band and may be implemented by virtual path shapers.

Assume that the cell switch is capable of controlling the output of cells from queue buffers. Then, the cell gates 344 and 346 may be omitted, and the ACT/STBY converters 264, 348, 272 and 350 may be replaced with cell gates, as stated in relation to the second embodiment. In this case, a cell switch LSI may be used in order to switch the queue buffers on the basis of the interlocked operation of the cell switch and output shapers, as in the first embodiment.

The third embodiment may be additionally provided with a function of controlling the cell rate, as follows. For the control of the cell rate, the output rate of the shapers are controlled on the basis of rate control information carried by cells, thereby increasing the total utilization efficiency. Let cells carrying rate control information be referred to as RM (Resource Management) cells by way of example. An arrangement is made such that the shapers subjected to output rate control are, e.g., the input shapers 340 and 342 shown in FIG. 22A.

However, information essential for determining the content of control include the information of the output shapers 60 and 66 shown in FIG. 22B. In the third embodiment, the cell switches 20 and 22 and shapers 60 and 66 are switched independently of the input shapers 340 and 342. This would obstruct accurate control over a certain period of time during the course of switching. A fourth embodiment to be described hereinafter is capable of solving this problem by interconnecting the outputs of the output shapers 60 and 66 and rate control circuits.

Fourth Embodiment

Figure 31A:
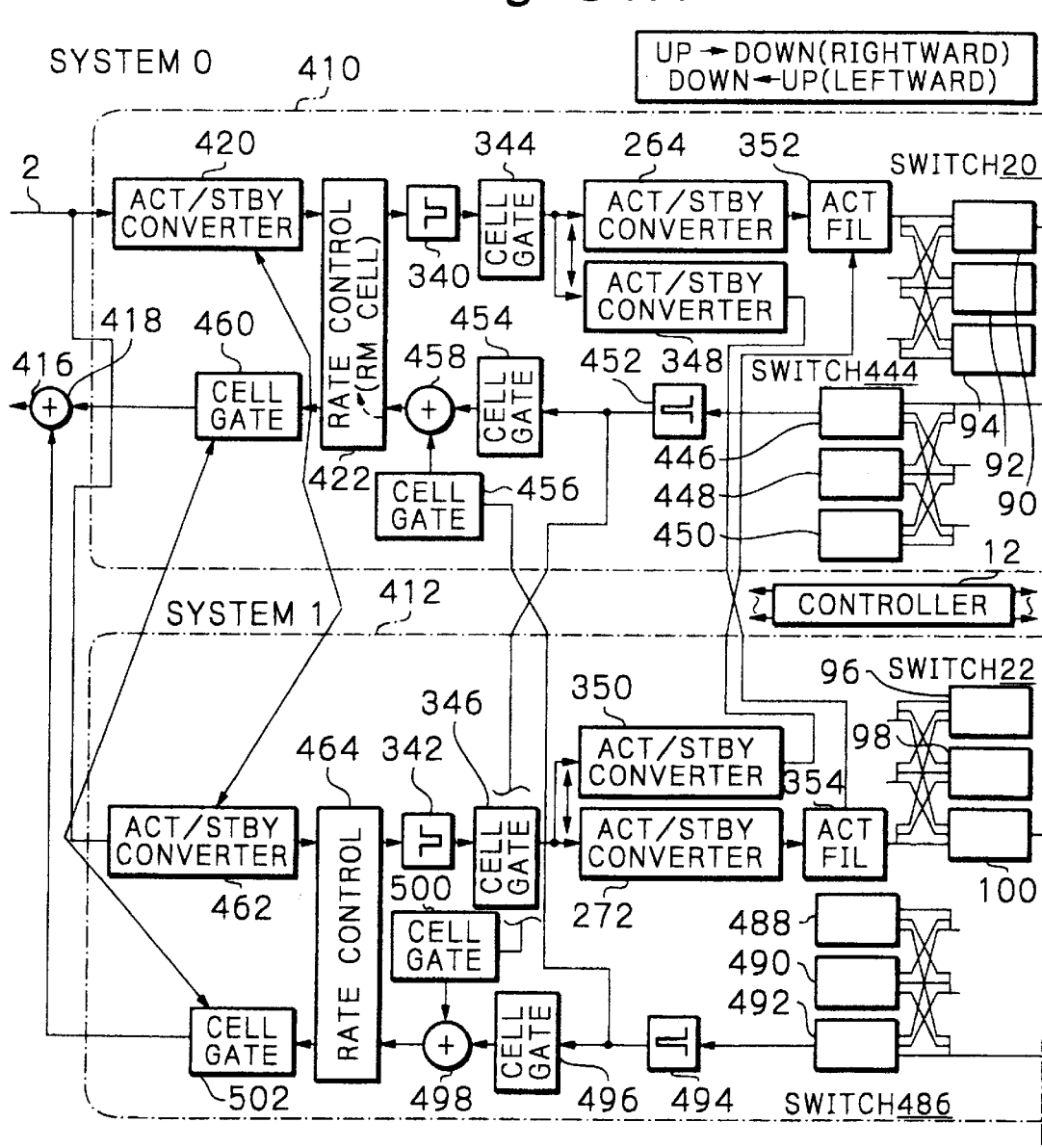
FIGS. 31A and 31B are combined.
Figures 31, 31B:
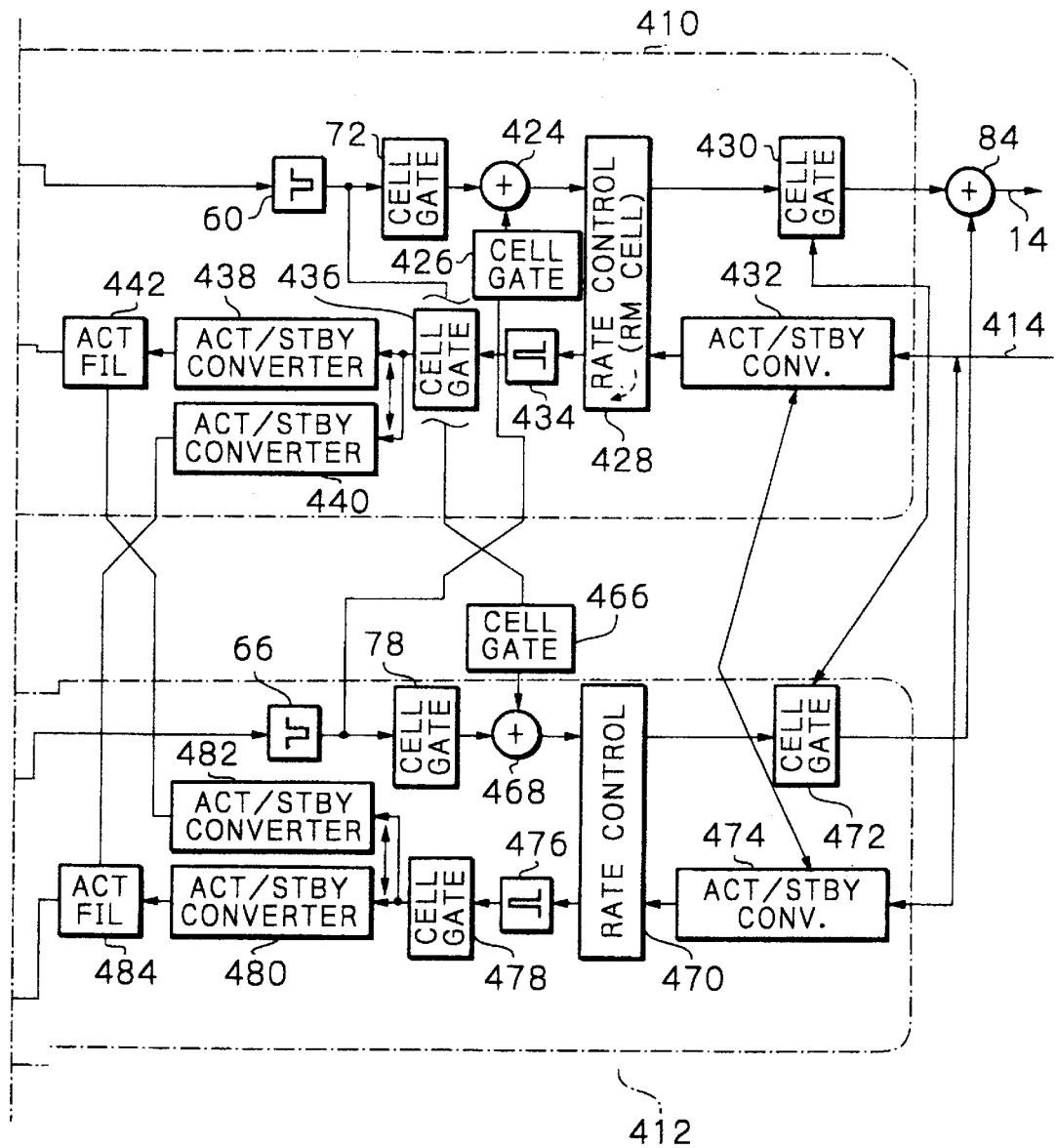
FIG. 31 shows how

A fourth embodiment will be described with reference to FIGS. 31A and 31B. In FIGS. 31A and 31B, structural elements similar to the structural elements of any of the previous embodiments are designated by the same reference numerals and will not be described specifically in order to avoid redundancy. This embodiment is not constructed to interrupt read-out from the queue buffers of the cell switches 20 and 22. As for rate control circuits, if cell sequences are identical, cell sequences input to cell switching circuitry 410 and 412 assigned to the systems ZERO and ONE, respectively, are assumed to be identical except for the contents of information carried by RM cells. The illustrative embodiment, like the third embodiment, includes the ACT FILs 352 and 354.

As shown in FIGS. 31A and 31B, additional interconnection is implemented by cell gates 426, 466, 456 and 500 and OR gates 424, 468, 458 and 498. The sides of rate controls 422, 428, 464 and 470 extending outward of the cell switching system are not directly controlled by software or firmware, but controlled by hardware as to contrary control between the system ZERO and the system ONE; the execution of the contrary control is commanded by software processing. Inputs to the rate controls 422, 428, 464 and 470 from the outside of the cell switching system are implemented by ACT/STBY converters 420, 432, 462 and 474 in place of cell gates, so that cell sequences input to the systems ZERO and ONE coincide with each other. In this condition, cells simply distinguishing active cells and standby cells arrive at the input shapers 340 and 342 and output shapers 434 and 476. It is therefore necessary to discard standby cells.

In FIGS. 31A and 31B, to better understand the interchange of RM cells for rate control and routes for shaper control particular to the illustrative embodiment, the systems ZERO and ONE each is shown as having two representative ports respectively assigned to the up-going path and down-going path of the associated cell switch.

When the rate control 422 belonging to the system ZERO receives an RM cell in addition to an active cell from the OR gate 458 in the system ZERO, the rate control 422 controls the rate of cells on the down-going path and the rate of cells on the up-going path. The rate control 428 also belonging to the system ZERO generates, based on the rate of cells output from the OR gate 424, an RM cells for controlling ABR and delivers it to the up-going path together with the active or standby cell. When the cell switch in the system ONE is substituted for the cell switch in the system ZERO, the RM cell output from the rate control 428 is routed through the shaper 434, a cell gate 436, an ACT/STBY converter 440, an ACT FIL 484 in the system ONE, a cell switch 486, a shaper 494, the cell gate 456 in the system ZERO and the OR gate 458 to the rate control 422. The rate controls 464 and 470 included in the system ONE operate in the same manner as the rate controls 422 and 428, respectively.

Figure 32:
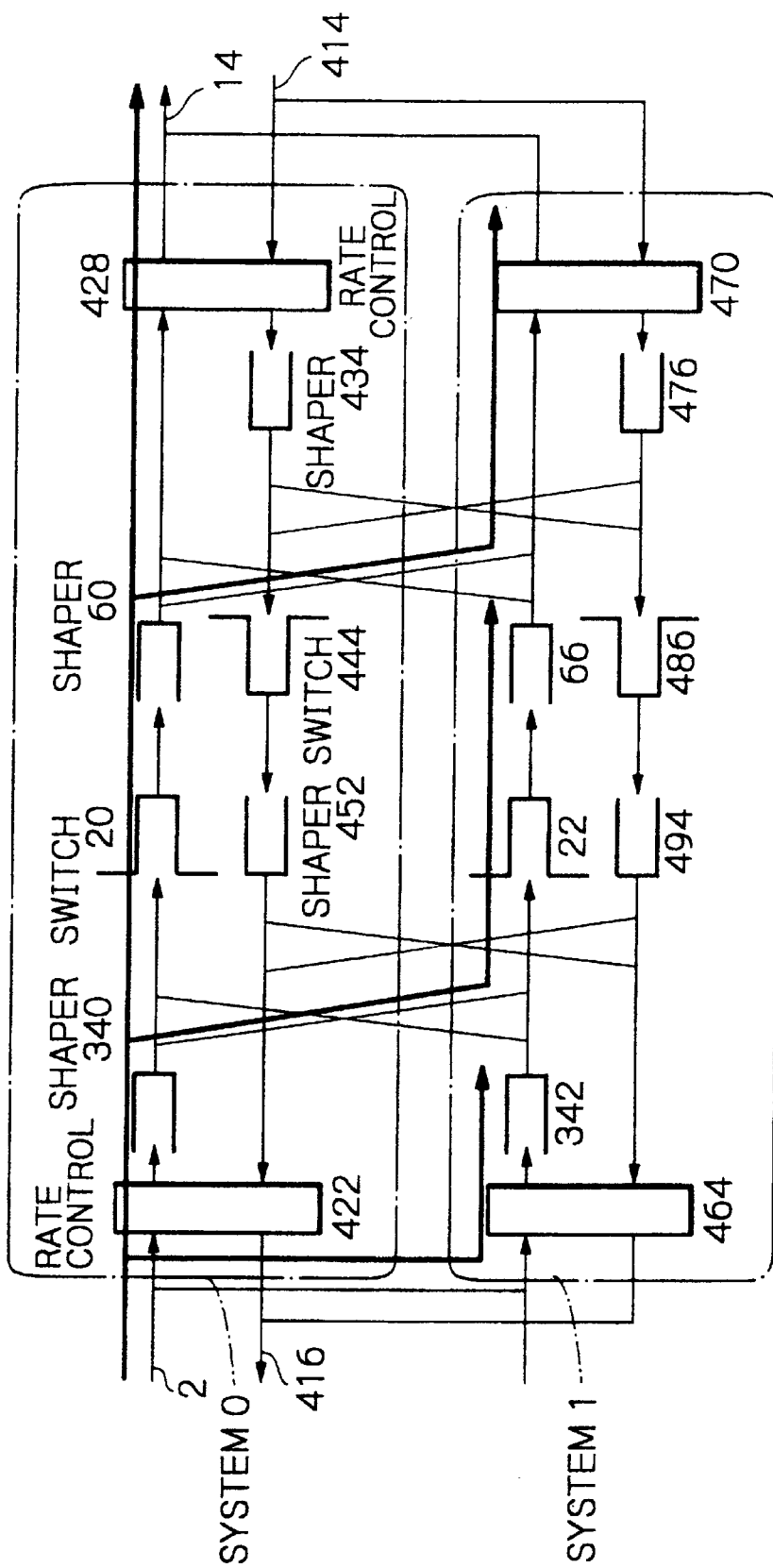
FIGS. 32–34 show how the flow of cells varies in the fourth embodiment during the course of switching operation.
Figure 33:
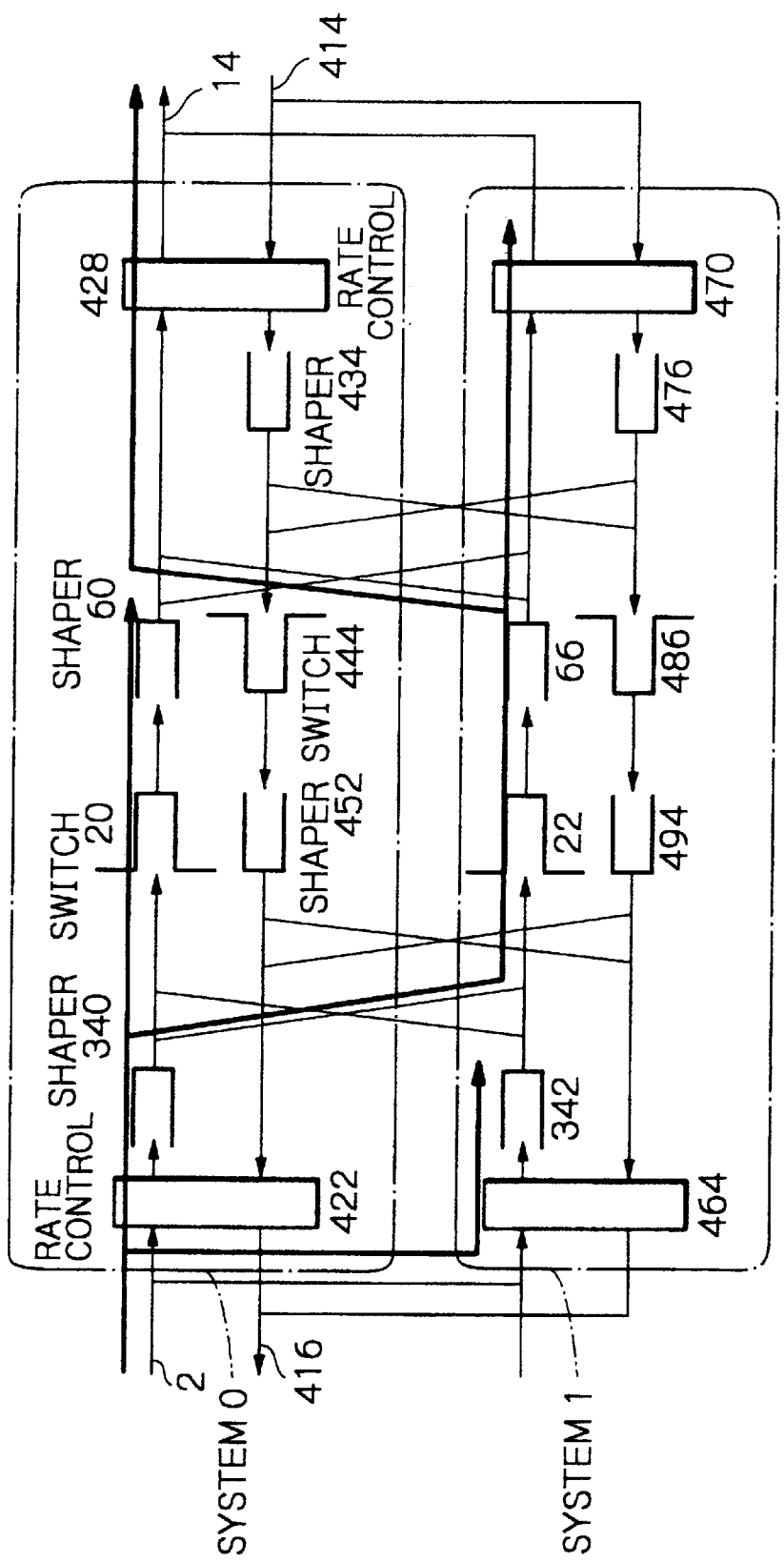
Figure 34:
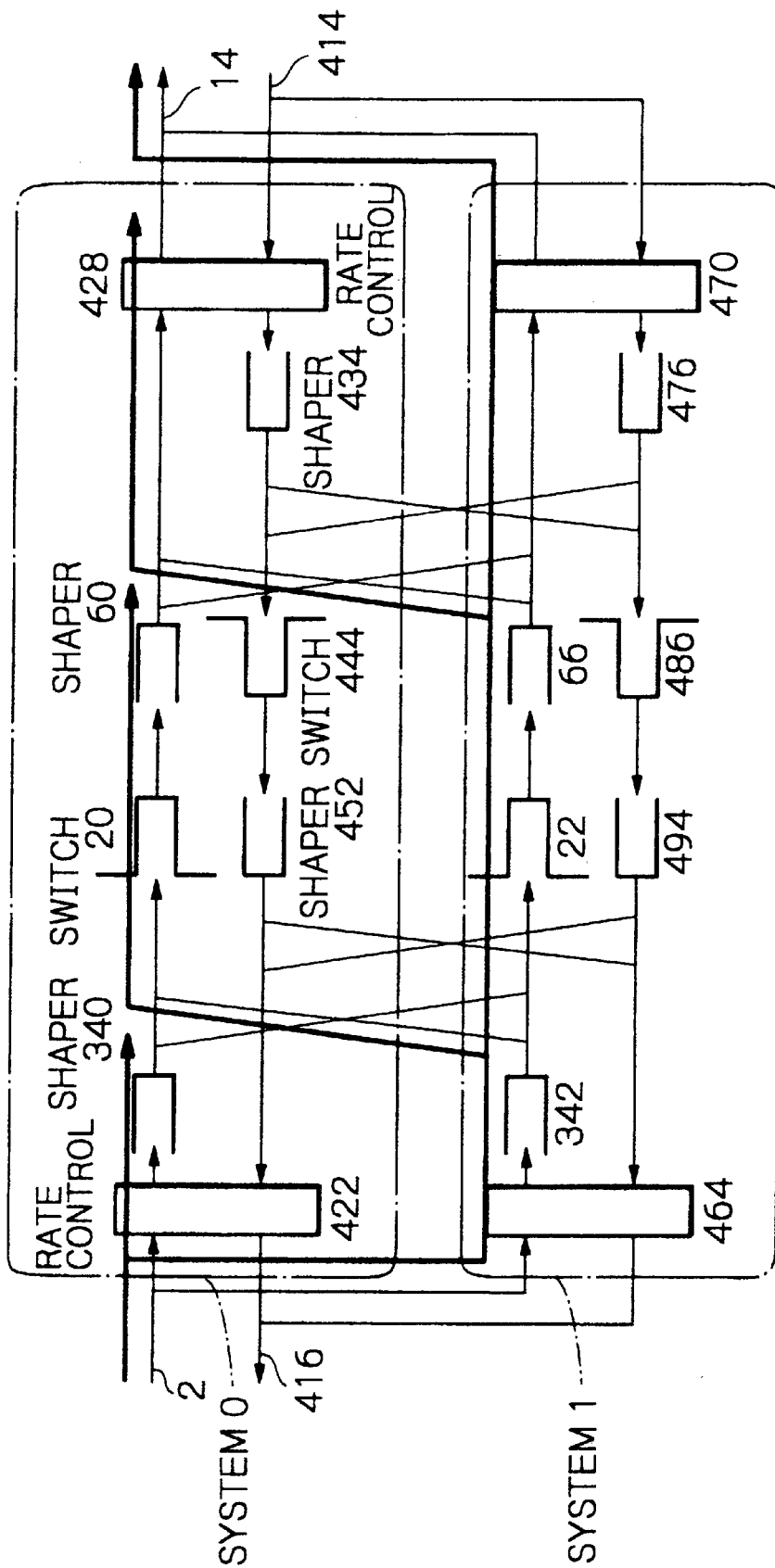

FIGS. 32–34 each shows a particular flow of cells to occur in the illustrative embodiment together with a particular flow of signals. In FIGS. 32–34, the cell switching circuitry 410 and 412 assigned to the systems ZERO and ONE, respectively, are assumed to be active and standby, respectively. In FIG. 32, bold lines are representative of the flow of cells usually occurring before switching. As shown in FIG. 32, while cells input to the system ZERO or active system flow through the same system, they are also delivered to the system ONE or standby system in order to match the conditions of the shapers and those of the rate control circuits as far as possible. Basically, an identical cell sequence is input from the input line to the shapers 60, 66, 452 and 494 of the two systems. This is also true with the rate controls 422, 428, 464 and 470.

First, as shown in FIG. 33, the cell switch 22 is substituted for the cell switch 20 on the rightward path, and at the same time the shaper 60 is substituted for the shaper 66. The correspondence between the output cell gates 72 and 78 in FIG. 22B and the cell gates 72, 426, 454, 456, 78, 466, 496 and 500 of FIGS. 31A and 31B indicate that the above cell switches 20 and 22 and shapers 60 and 66 are switched in the same manner as in the third embodiment. When this switching step completes, cells flow along bold lines shown in FIG. 33. During the interval between the start and the end of the above switching, the operation of the system ZERO and that of the system ONE are not noticeably different because the same cell sequence is input to the rate controls 422, 428, 464 and 470.

Subsequently, the shapers 340, 342, 434 and 476 located at the input side are switched. This part of the operation is executed in the same manner as in the third embodiment except for the cell gates 430, 460, 472 and 502, FIG. 31. After the switching of the shapers 60, 66, 452 and 494 located at the output side, the outputs of the rate controls 422, 428, 464 and 470 delivered to the cell gates 430, 460, 472 and 502, respectively, are identical except for the contents of RM cells. Therefore, software outputs a contrary control command after the switching of the shapers 340, 342, 434 and 476 has substantially completed, but before the ACT/STBY converter 420 is conditioned for the output of active cells.

As a result of the above switching, a cell path shown in FIG. 34 is set up. As shown, cells flow along bold lines, i.e., through the system ONE in a condition fully opposite to the condition existed before switching.

Figure 35:
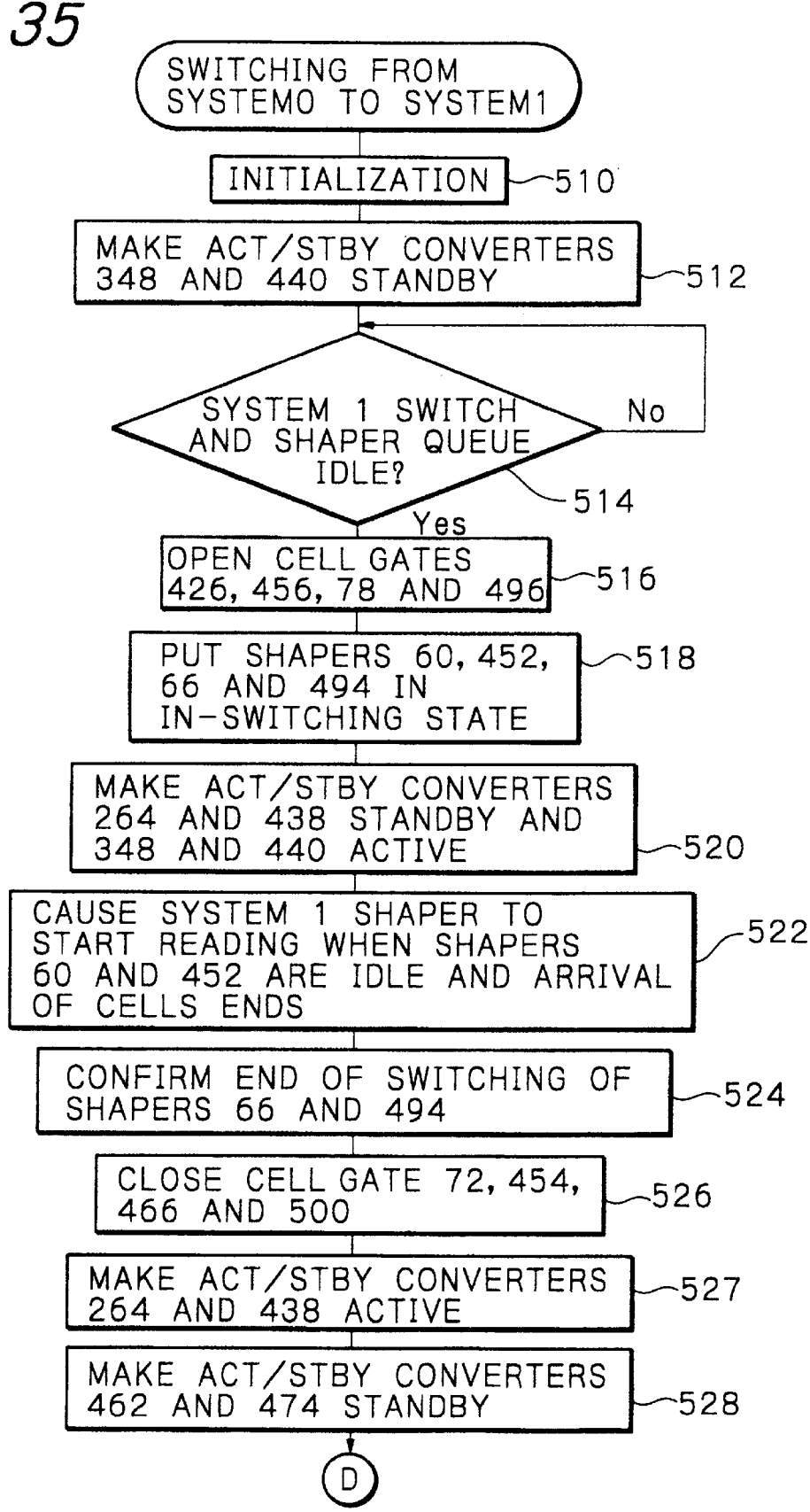
FIGS. 35 and 36 demonstrate a specific operation of the fourth embodiment.
Figure 36:
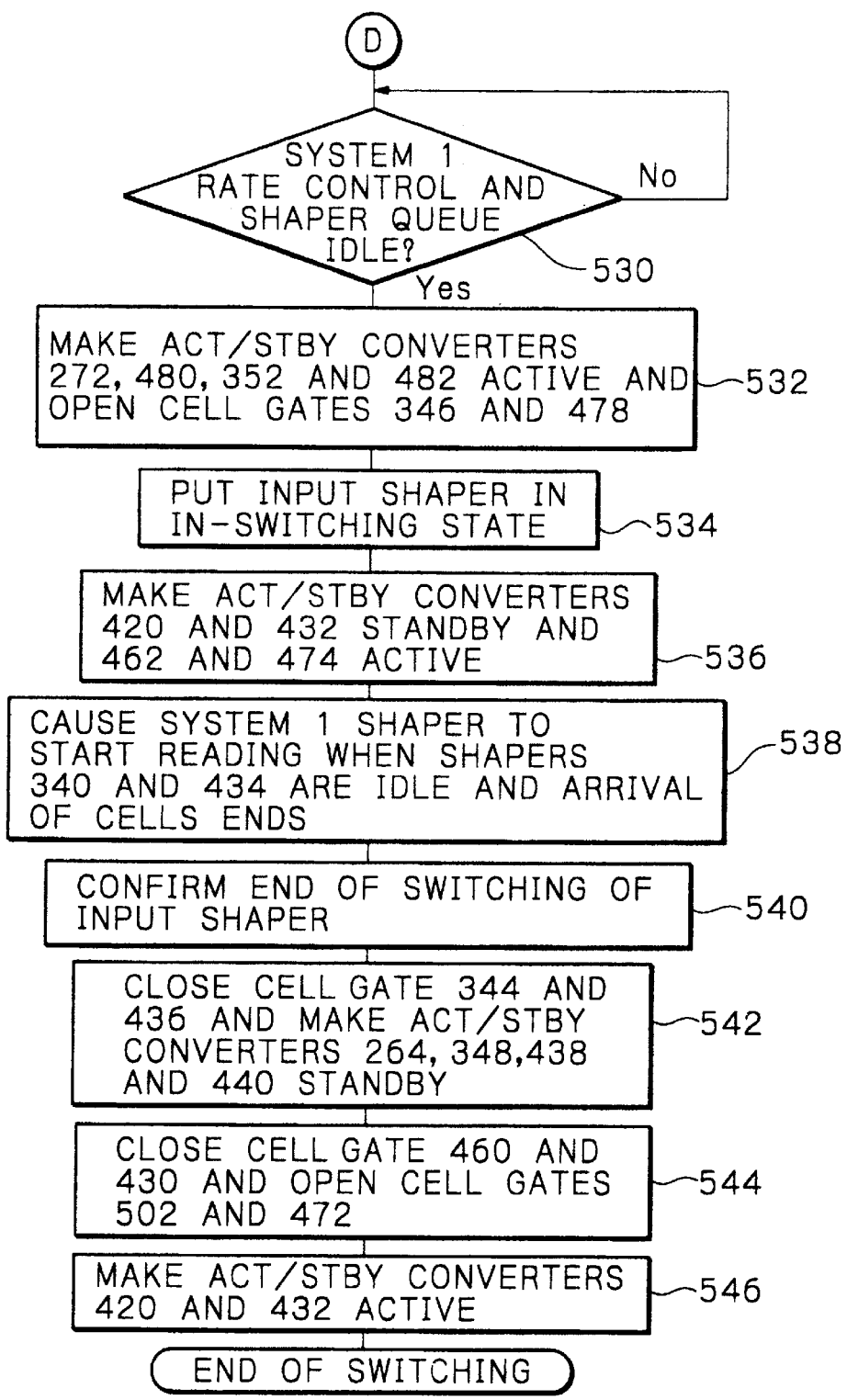

A specific operation of the illustrative embodiment will be described with reference to FIGS. 35 and 36. As shown, the controller 12 initializes the various sections of the cell switching device (step 510). Specifically, the controller 12 conditions the ACT/STBY converters 420, 462, 432 and 474 belonging to the systems ZERO and ONE for the output of active cells and the ACT/STBY converters 272, 350, 480 and 482 belonging to the system ONE for the output of standby cells. At the same time, the controller 12 opens the cell gates 344, 436, 72, 454, 466, 500, 430 and 460 while closing the cell gates 346, 478, 426, 456, 78, 496, 472 and 502. Further, the controller 12 puts the queue buffers in the input shapers 340, 434, 342 and 476 in the systems ZERO and ONE and the queue buffers in the output shapers 60, 452, 66 and 494 in the systems ZERO and ONE in a fully switched condition.

Subsequently, to switch the cell switches 20, 22, 444 and 486 and output shapers 60, 452, 66 and 494 in the systems ZERO and ONE, the controller 12 conditions the ACT/STBY converters 348 and 440 for the output of standby cells (step 512). On the elapse of the maximum period of time necessary for a cell to pass through the cell switches 22 and 486 and output shapers 66 and 494, the controller determines whether or not the queue buffers of the cell switches 22 and 486 and output shapers 66 and 494 have been evacuated (step 514). If the answer of the step 514 is Yes, the controller 12 opens the cell gates 426 and 456 and opens the cell gates 78 and 496 (step 516).

After the step 516, the controller 12 puts the output shapers 60, 452, 66 and 494 in the systems ZERO and ONE in the in-switching condition (step 518). Then, the controller 12 conditions the ACT/STBY converters 264 and 438 of the system ZERO for the output of standby cells and conditions the ACT/STBY converters 348 and 440 in the system ZERO and used for interconnection for the output of active cells (step 520), doing altogether at the same time. After the output shapers 60 and 452 in the system ZERO have been evacuated and if the arrival of cells has ended, the controller 12 causes the output shapers 66 and 494 in the system ONE to start reading cells out of their queue buffers by autonomous hardware operation (step 522).

Subsequently, the controller 12 closes the output cell gates 72 and 454 of the system ZERO and the output cell gates 466 and 500 in the system ONE (step 526). Thereafter, the controller 12 conditions the ACT/STBY converters 264 and 438 in the system ZERO for the output of active cells (step 527). By the procedure described so far, the cell switches 22 and 486 and output shapers 66 and 494 in the system ONE are rendered active.

In the second stage, the controller 12 substitutes the rate controls 464 and 470 in the system ONE for the rate controls 422 and 428 of the system ZERO and substitutes the input shapers 342 and 476 in the system ONE for the input shapers 340 and 434 of the system ZERO. Specifically, the controller 12 conditions the ACT/STBY converters 462 and 474 in the system ONE for the output of standby cells (step 528). When the maximum period of time necessary for a cell to pass through the flow controls 464 and 470 and the queue buffers in the input shapers 342 and 476 belong to the system ONE elapses, the controller 12 determines whether or not the queue buffers in the input shapers 342 and 476 have been evacuated (step 530). If the answer on the step 530 is Yes, the controller 12 conditions the ACT/STBY converters 272, 350, 480 and 482 in the system ONE for the output of active cells and opens the input gates 346 and 478 in the system ONE (step 532).

After the step 532, the controller 12 puts the input shapers 340, 434, 342 and 476 in the in-switching (step 534). Then, the controller 12 conditions the ACT/STBY converters 420 and 432 in the system ZERO for the output of standby cells and conditions the ACT/STBY converters 462 and 474 in the system ONE for the output of active cells, doing altogether at the same time (step 536). After the shapers 340 and 434 in the system ZERO have been evacuated and if the arrival of cells has ended, the controller 12 causes the input shapers 342 and 476 in the system ONE to start reading cells out of their queue buffers by autonomous hardware operation (step 538).

After confirming the switching of the input shapers 340 and 434 (step 540), the controller 12 closes the input cell gates 344 and 436 in the system ZERO and conditions the ACT/STBY converters 264, 348, 438 and 440 in the system ZERO for the output of standby cells (step 542). Then, the controller 12 closes the output cell gates 430 and 460 of the system ZERO while opening the output cell gates 472 and 502 in the system ONE, doing altogether simultaneously (step 544). Finally, the controller 12 conditions the ACT/STBY converters 420 and 432 in the system ZERO for the output of active cells (step 546). As a result, the rate controls 464 and 470 in the system ONE are substituted for the rate controls 422 and 428 in the system ZERO while the input shapers 342 and 476 in the system ONE are substituted for the input shapers 340 and 434 in the system ZERO.

With the above construction and operation, the illustrative embodiment is capable of implementing, when ABR control or similar rate control for controlling input shapers in response to information (RM cells) received from the output shapers of the cell switch, hit-less switching from the system ZERO to the system ONE while guaranteeing the rate control.

In summary, it will be seen that the present invention provides a cell switching device capable of effecting hit-less switching between an active cell switch and a standby cell switch. In addition, the cell switching device allows ABR control to be continued despite the hit-less switching.

The entire disclosure of Japanese patent application No. 133671/1998 filed on May 15, 1998 and including the specification, claims, accompanying drawings and abstract of the disclosure is incorporated herein by reference in its entirety.

While the present invention has been described with reference to the illustrative embodiments, it is not to be restricted by the embodiments. It is to be appreciated that those skilled in the art can change or modify the embodiments without departing from the scope and spirit of the present invention.

What is claimed is:

1. A cell switching device comprising:

first cell switching circuitry including a first input port for receiving cells for ATM (Asynchronous Transfer mode) communication, and a first cell switch including a queue circuit for temporarily storing said cells, said first cell switch outputting said cells from said queue circuit to a first output port matching with a transfer route;

second cell switching circuitry including a second input port for receiving cells for ATM communication, and a second cell switch including a queue circuit for temporarily storing said cells, said second cell switch outputting said cells from said queue circuit to a second output port matching with a transfer route;

wherein when either one of said first and second cell switching circuitry is held in an active state, the other of said first and second cell switching circuitry is held in a standby state;

said first cell switching circuitry further including a first cell gate for selectively passing the cells received to said first input port or blocking said cells, a first shaper including a queue circuit for temporarily storing the cells output from said first output port to thereby adjust intervals between said cells to be transferred, and a second cell gate for selectively passing the cells output from said first shaper or blocking said cells;

said second cell switching circuitry further including a third cell gate for selectively passing the cells received to said second input port or blocking said cells, a second shaper including a queue circuit for temporarily storing the cells output from said second output port to thereby adjust intervals between said cells to be transferred, and a fourth cell gate for selectively passing the cells output from said second shaper or blocking said cells;

said first cell gate and said third cell gate having a common input connected to receive cells;

a cell outputting circuit for selecting and outputting the cells output from either one of said second cell gate and said fourth cell gate held in an active state; and a controller for controlling the passage of the cells through said first to said fourth cell gate and controlling said first cell switch, said second cell switch, said first shaper and said second shaper to thereby effect hit-less switching from said one cell switching circuitry held in the active state to said other cell switching circuitry held in the standby state.

2. A cell switching device in accordance with claim 1, wherein said controller makes said first cell switching circuitry active, opens said first cell gate to said third cell gate for passing the cells, closes said fourth cell gate for blocking the cells, and then makes said second cell switching circuitry active by a sequence of steps of:

closing said third gate, opening, when said queue circuit in said second cell switch and said queue circuit in said second shaper are evacuated, said fourth cell gate and putting said first cell switch, said second cell switch, said first shaper and said second shaper in an in-switching condition;

closing said first cell gate and opening said third cell gate at the same cell cycle;

causing, when an arrival of the cells at said first cell switch and said first shaper ends, said second cell switch and said second shaper to start reading the cells stored therein; and closing said second cell gate and opening said first cell.

3. A cell switching device comprising:

first cell switching circuitry including a first input port for receiving cells for ATM communication, and a first cell switch for outputting said cells to a first output port matching with a transfer route;

second cell switching circuitry including a second input port for receiving cells for ATM communication, and a second cell switch for outputting said cells to a second output port matching with a transfer route;

said cells received by said first and second cell switches being identical to each other between said first and second cell switches;

wherein when either one of said first and second cell switching circuitry is held in an active state, the other of said first and second cell switching circuitry is held in a standby state;

said first cell switching circuitry further including a first converter for feeding, when said first cell switching circuitry is active, the cells received to said first input port as active cells or feeding, when said first cell switching circuitry is standby, said cells to said first input port as standby cells, a first shaper including a queue circuit for temporarily storing the cells output from said first output port to thereby adjust intervals between said cells to be transferred, and a first cell gate for selectively passing the cells output from said first shaper or blocking said cells;

said second cell switching circuitry further including a second converter for feeding, when said second cell switching circuitry is active, the cells received to said second input port as active cells or feeding, when said second cell switching circuitry is standby, said cells to said second input port as standby cells, a second shaper including a queue circuit for temporarily storing the cells output from said second output port to thereby adjust intervals between said cells to be transferred, and a second cell gate for selectively passing said cells output from said second shaper or blocking said cells;

a cell outputting circuit for selecting and outputting the cells output from either one of said first cell gate and said second cell gate held in an active state; and a controller for controlling said first converter, said second converter, said first cell switch, said second cell switch, said first shaper and said second shaper and controlling the passage of the cells through said first cell gate and said second cell gate to thereby effect hit-less switching from said one cell switching circuitry held in the active state to said other cell switching circuitry held in the standby state.

4. A cell switching device in accordance with claim 3, wherein said controller makes said first cell switching circuitry active, conditions said first converter and said second converter for an output of active cells, opens said first cell gate, closes said second cell gate, and then makes said second cell switching circuitry active by a sequence of steps of:

conditioning said second converter for an output of standby cells, and opening, when said queue circuit of said second shaper is evacuated, said second cell gate and putting said first shaper and said second shaper in an in-switching condition;

conditioning said first converter for an output of standby cells and conditioning said second converter for an output of active cells at the same cell cycle;

causing, when an arrival of the cells at said first shaper ends, said second shaper to start reading the cells stored therein; and closing said first cell gate and conditioning said first converter for an output of active cells.

5. A cell switching device comprising:

first cell switching circuitry including a first input port for receiving cells for ATM communication, and a first cell switch for outputting said cells to a first output port matching with a transfer route;

second cell switching circuitry including a second input port for receiving cells for ATM communication, and a second cell switch for outputting said cells to a second output port matching with a transfer route;

said cells received by said first and second cell switches being identical to each other between said first and second cell switches;

wherein when either one of said first and second cell switching circuitry is held in an active state, the other of said first and second cell switching circuitry is held a standby state;

said first cell switching circuitry further including a first cell gate for selectively passing the cells received or blocking said cells, a first shaper including a queue circuit for temporarily storing the cells output from said first cell gate to thereby adjust intervals between said cells to be transferred, a second cell gate for selectively passing the cells output from said first shaper or blocking said cells, a first converter for feeding, when said first cell switching circuitry is active, the cells output from said second cell gate as active cells or feeding, when said first cell switching circuitry is standby, said cells as standby cells, a second converter for outputting, in response to the cells output from said second cell gate, standby cells or active cells contrarily to the output of said first converter, a first cell filter for outputting either one of the cells output from said first converter and the cells fed from said second cell switching circuitry via an interconnection, and feeding said cells to said first input port, a second shaper including a queue circuit for temporarily storing the cells output from said first output port to thereby adjust intervals between said cells to be transferred, and a third cell gate for selectively passing the cells output from said second shaper or blocking said cells;

said second cell switching circuitry further including a fourth cell gate for selectively passing the cells received or blocking said cells, a third shaper including a queue circuit for temporarily storing the cells output from said fourth cell gate to thereby adjust intervals between said cells to be transferred, a fifth cell gate for selectively passing the cells output from said third shaper or blocking said cells, a third converter for feeding, when said second cell switching circuitry is active, the cells output form said fifth cell gate as active cells or feeding, when said second cell switching circuitry is standby, said cells as standby cells, a fourth converter for outputting, in response to the cells output from said fifth cell gate, standby cells or active cells contrarily to the output of said third converter and feeding said standby cells or said active cells to said first cell filter via said interconnection, a second cell filter for outputting either one of said cells output from said third converter and said cells fed from said second converter via said interconnection and feeding said cells to said second input port, a fourth shaper including a queue circuit for temporarily storing the cells output from said second output port to thereby adjust intervals between said cells to be transferred, and a sixth cell gate for selectively passing the cells output from said fourth shaper or blocking said cells;

a cell outputting circuit for selecting and outputting the cells output from either one of said third cell gate and said sixth cell gate held in an active state; and a controller for controlling said first cell gate to said sixth cell gate, said first shaper to said fourth shaper, said first converter to said fourth converter to thereby effect hit-less switching from said one cell switching circuitry held in the active state to said other cell switching circuitry held in the standby state.

6. A cell switching device comprising:

first cell switching circuitry including a first input port for receiving cells for ATM communication, and a first cell switch for outputting said cells to a first output port matching with a transfer route;

second cell switching circuitry including a second input port for receiving cells for ATM communication, and a second cell switch for outputting said cells to a second output port matching with a transfer route;

said first input port and said second input port receiving identical cells in switching in said first and second cell switches;

wherein when either one of said first and second cell switching circuitry is held in an active state, the other of said first and second cell switching circuitry is held in a standby state;

said first cell switching circuitry further including a first converter for outputting, when said first cell switching circuitry is active, active cells in response to the cells received or outputting, when said first cell switching circuitry is standby, standby cells in response to said cells received, a first rate control circuit for controlling a rate of the cells output from said first converter, a first shaper including a queue circuit for temporarily storing the cells output from said first rate control circuit to thereby adjust intervals between said cells to be transferred, a first cell gate for selectively passing the cells output from said first shaper or blocking said cells, a second converter for outputting, when said first cell switching circuitry is active, active cells in response to the cells output from said first cell gate or outputting, when said first cell switching circuitry is standby, standby cells in response to said cells, a third converter for outputting, in response to the cells output from said first cell gate, standby cells or active cells contrarily to said second converter, a first cell filter for outputting either one of the cells output from said second converter and the cells fed from said second cell switching circuitry via a first interconnection, and feeding said cells to said first input port, a second shaper including a queue circuit for temporarily storing the cells output from said first output port to thereby adjust intervals between said cells to be transferred, a second cell gate for selectively passing the cells output from said second shaper or blocking said cells, a third cell gate for selectively passing the cells received from said second cell switching circuit via a second interconnection or blocking said cells, a first gating circuit for passing active cells therethrough on the basis of the cells output from said third cell gate and the cells output from said second cell gate, a second rate control circuit for controlling a rate of the cells output from said first gating circuit, and a fourth cell gate for selectively passing the cells output from said second control means or blocking said cells;

said second cell switching circuit further including a fourth converter for outputting, when said second cell switching circuitry is active, active cells in response to the cells received or outputting, when said second cell switching circuitry is standby, standby cells in response to said cells received, a third rate control circuit for controlling a rate of the cells output from said fourth converter, a third shaper including a queue circuit for temporarily storing the cells output from said third rate control circuit to thereby adjust intervals between said cells to be transferred, a fifth cell gate for selectively passing the cells output from said third shaper or blocking said cells, a fifth converter for outputting, when said second cell switching circuitry is active, active cells in response to the cells output from said fifth cell gate or outputting, when said second cell switching circuitry is standby, standby cells in response to said cells, a sixth converter for outputting, in response to the cells output from said fifth cell gate, standby cells or active cells contrarily to said fifth converter and feeding said standby cells or said active cells to said first cell filter via said first interconnection, a second cell filter for outputting either one of the cells output from said fifth converter and the cells fed from said third converter by said first interconnection, and feeding said cells to said second input port, a fourth shaper including a queue circuit for temporarily storing the cells output from said second output port to thereby adjust intervals between said cells to be transferred and feeding said cells to said third cell gate via said second interconnection, a sixth cell gate for selectively passing the cells output from said fourth shaper or blocking said cells, a seventh cell gate for selectively passing the cells received from said second shaper via said second interconnection or blocking said cells, a second gating circuit for passing active cells therethrough on the basis of the cells output from said seventh cell gate and the cells output from said sixth cell gate, a fourth rate control circuit for controlling a rate of the cells output from said second gating circuit, and an eighth cell gate for selectively passing the cells output from said fourth rate control circuit or blocking said cells;

a cell outputting circuit for selecting and outputting the cells output from either one of said fourth cell gate and said eighth cell gate held in an active state; and a controller for controlling said first cell gate to said eighth cell gate, said first shaper to said fourth shaper and said first converter to said sixth converter to thereby effect hit-less switching from said one cell switching circuitry held in the active state to said other cell switching circuitry held in the standby state.

* * * * *